(12) United States Patent
Itoh et al.

(10) Patent No.: US 8,369,516 B2
(45) Date of Patent: Feb. 5, 2013

(54) ENCRYPTION APPARATUS HAVING COMMON KEY ENCRYPTION FUNCTION AND EMBEDDED APPARATUS

(75) Inventors: Kouichi Itoh, Kawasaki (JP); Souichi Okada, Kawasaki (JP); Masahiko Takenaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 195 days.

(21) Appl. No.: 12/889,096

(22) Filed: Sep. 23, 2010

(65) Prior Publication Data
US 2011/0013769 A1 Jan. 20, 2011

Related U.S. Application Data

(63) Continuation of application No. PCT/JP2008/000837, filed on Mar. 31, 2008.

(51) Int. Cl.
*G06F 21/00* (2006.01)
(52) U.S. Cl. ........................................ 380/28
(58) Field of Classification Search ............ 380/28, 380/263
See application file for complete search history.

(56) References Cited

U.S. PATENT DOCUMENTS

| 5,206,824 | A * | 4/1993 | Arazi ............................. 708/492 |
| 2003/0048903 | A1 * | 3/2003 | Ito et al. ........................ 380/263 |
| 2005/0207571 | A1 * | 9/2005 | Ahn et al. ....................... 380/28 |
| 2005/0283714 | A1 | 12/2005 | Korkishko et al. |
| 2009/0172068 | A1 * | 7/2009 | Kounavis et al. ............. 708/606 |

FOREIGN PATENT DOCUMENTS

| JP | 2002-366029 | 12/2002 |
| JP | 2005-266810 | 9/2005 |
| JP | 2006-3905 | 1/2006 |
| JP | 2006-203416 | 8/2006 |

OTHER PUBLICATIONS

Golic J D et al., "Multiplicative Masking and Power Analysis of AES" Cryptographic Hardware and Embedded Systems—CHES 2002, Jan. 2002, pp. 198-212.
European Search Report dated May 27, 2011 in corresponding European Patent Application 08720703.1.
Thomas S. Messerges et al., "Power Analysis Attacks of Modular Exponentiation in Smartcards," Cryptographic Hardware and Embedded Systems (CHES'99), Springer-Verlag, 1999, p. 144-157.
Paul Kocher et al., "Differential Power Analysis," Cryptology (CRYPTO'99), Springer-Verlag, 1999, p. 388-397.
Suresh Chari et al., "A Cautionary Note Regarding Evaluation of AES Candidates on Smart-Cards," Second Advanced Encryption Standard Candidate Conference, Mar. 1999, p. 1-15.

(Continued)

*Primary Examiner* — Oscar Louie
*Assistant Examiner* — Sanchit Sarker
(74) *Attorney, Agent, or Firm* — Staas & Halsey LLP

(57) ABSTRACT

A common key block encryption apparatus for performing a nonlinear transformation with a multiplication executed in a binary field or a composite field includes a computing unit to execute a computation other than the nonlinear transformation with fixed value masked input data obtained by XORing input data with a fixed mask value, an XOR operation circuit to transform all input data into fixed value masked input data by XORing the input data with a fixed mask value and to transform the data into random value masked input data by XORing the input data with a random mask value in the multiplication, a multiplier to execute a multiplication based on the random value masked input data output from the XOR operation circuit, and a random value mask-to-fixed mask value transformation circuit to again transform the random value masked output data into fixed value masked output data and to output the data.

8 Claims, 37 Drawing Sheets

OTHER PUBLICATIONS

National Institute of Standards and Technology, "Advanced Encryption Standards (AES)," Federal Information Processing Standards Publication 197, Nov. 2001, p. 1-47, <http://csrc.nist.gov/publications/fips/fips197/fips-197.pdf>.

Thomas S. Messerges et al., "Investigations of Power Analysis Attacks on Smartcards," USENIX Workshop on Smartcard Technology, The USENIX Association, May 1999, 12pp.

Takeshi Shimoyama et al., "The Block Cipher SC2000," Fast Software Encryption (FSE 2001), LNCS vol. 2355, Springer-Verlag, 2002, p. 312-327.

Mehdi-Laurent Akkar et al., "Power Analysis, What Is Now Possible," ASIACRYPT 2000, Springer-Verlag, 2000, p. 489-502.

Thomas S. Messerges, "Securing the AES Finalists Against Power Analysis Attacks," Fast Software Encryption Workshop (FSE 2000), Springer-Verlag, 2001, p. 150-164.

Elena Trichina, "Combinational Logic Design for AES Subbyte Transformation on Masked Data," Cryptology ePrint Archive: Report 2003/236, 2003, p. 1-13, <http://eprint.iacr.org/2003/236>.

Akashi Satoh et al., "A Compact Rijndael Hardware Architecture with S-Box Optimization," Advances in Cryptology, ASIACRPYPT 2001, LNCS 2248, Springer-Verlag, 2001, p. 239-254.

Sumio Morioka et al., "DPA Attack to AES S-Box Circuits Over Composite Fields," Computer Security Symposium, 2004, p. 679-684.

Nobuyuki Kawahata et al., "A Power Masking Multiplier Based on Galois Field for Composite Field AES," IEICE Technical Report VLD2007-88, vol. 107, No. 335, The Institute of Electronics, Information and Communication Engineers, 2007, p. 37-42.

International Search Report for PCT/JP2008/000837, mailed on May 27, 2008.

Japanese Office Action issued Nov. 27, 2012 in corresponding Japanese Patent Application No. 2010-505044.

\* cited by examiner

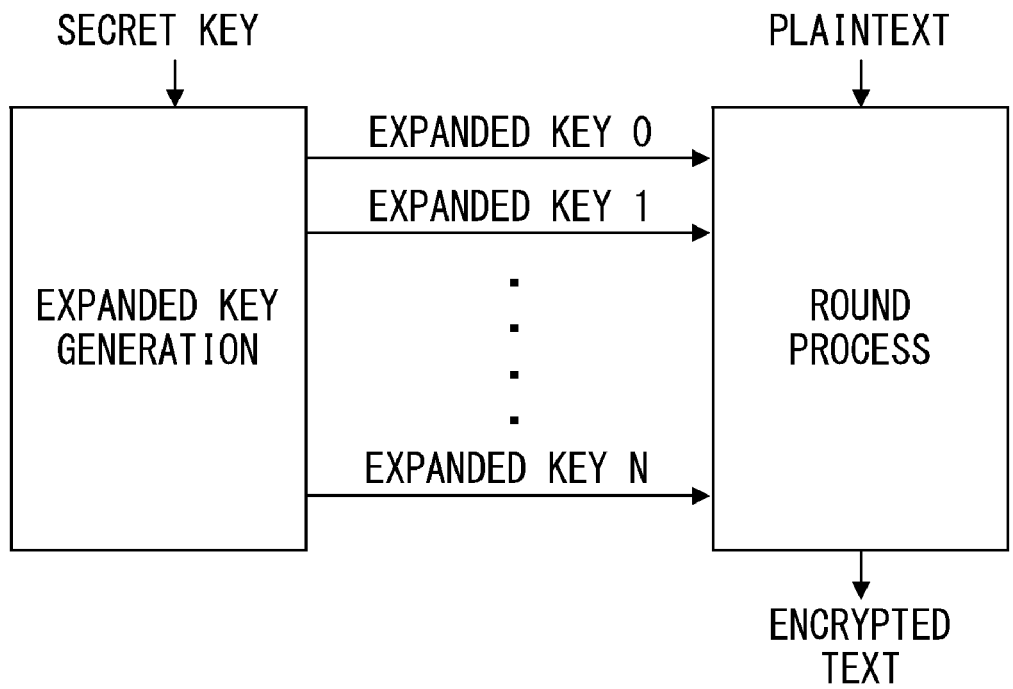
F I G. 1

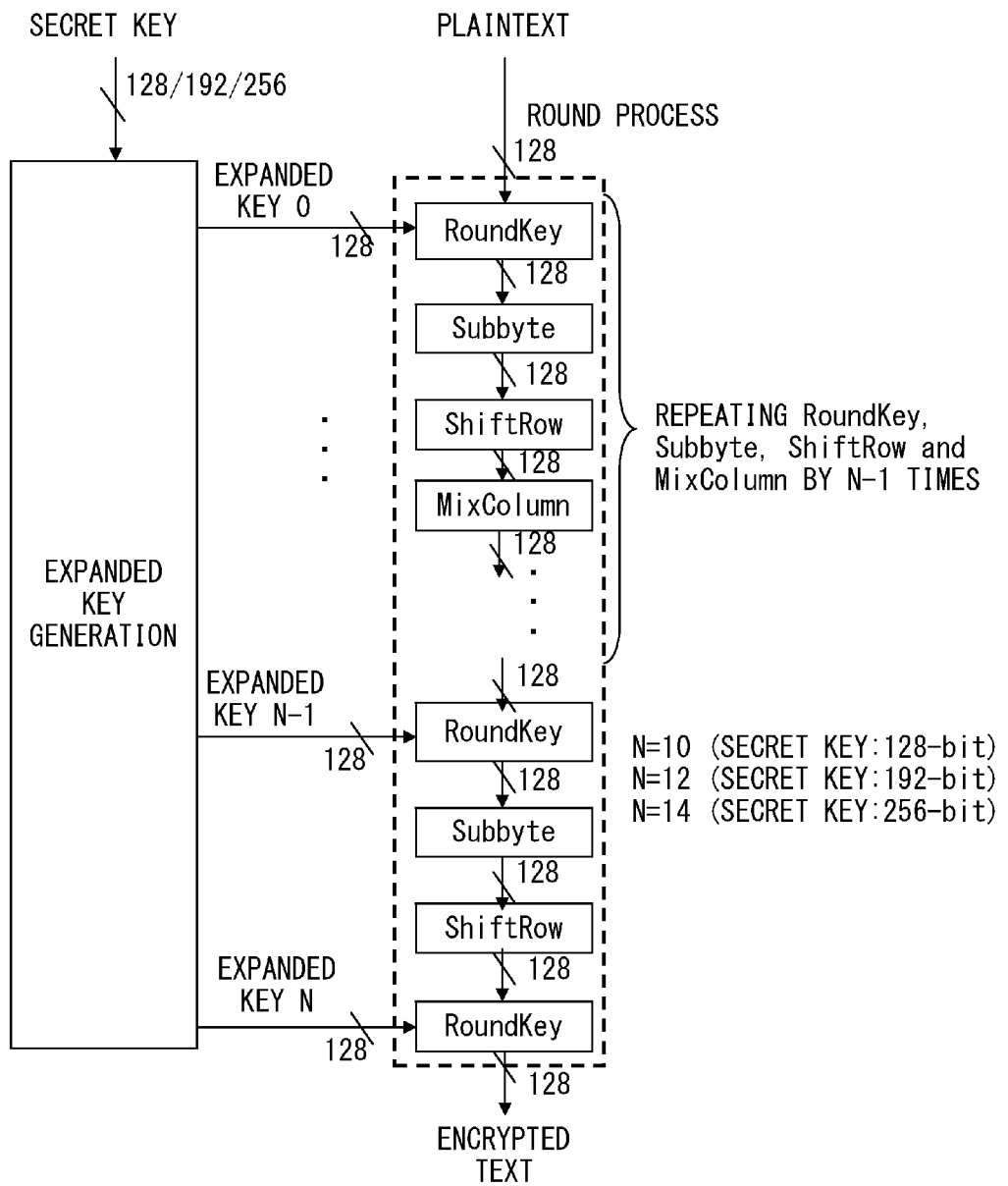
F I G. 2

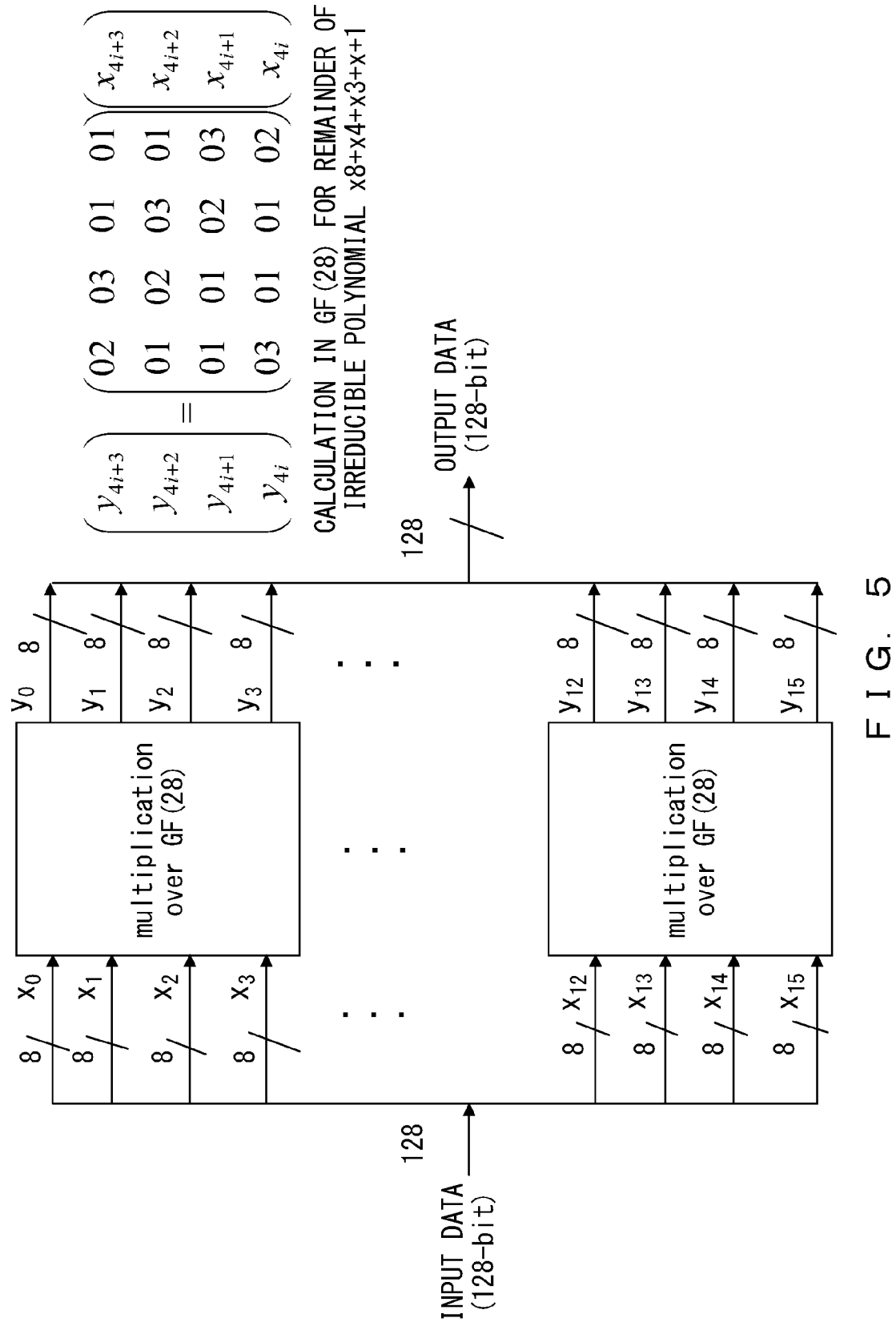
F I G. 5

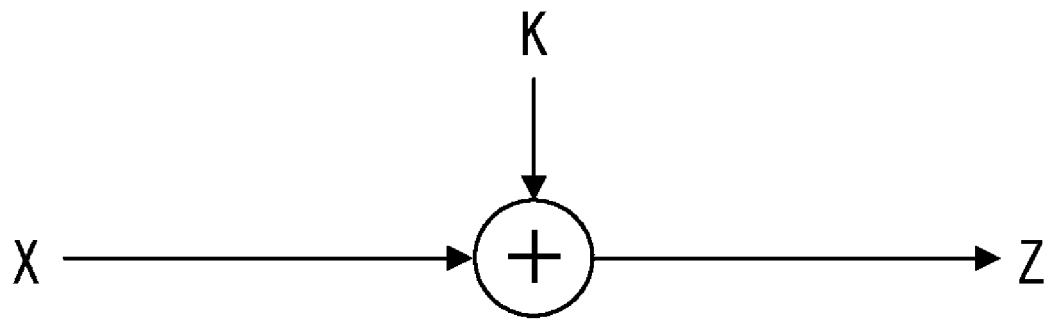
F I G. 7

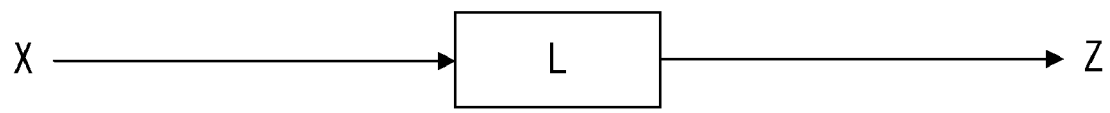
TRANSFORMATION L SATISFIES L(X⊕Y)=L(X)⊕L(Y)
(X AND Y ARE ARBITRARY VALUES)
F I G. 8

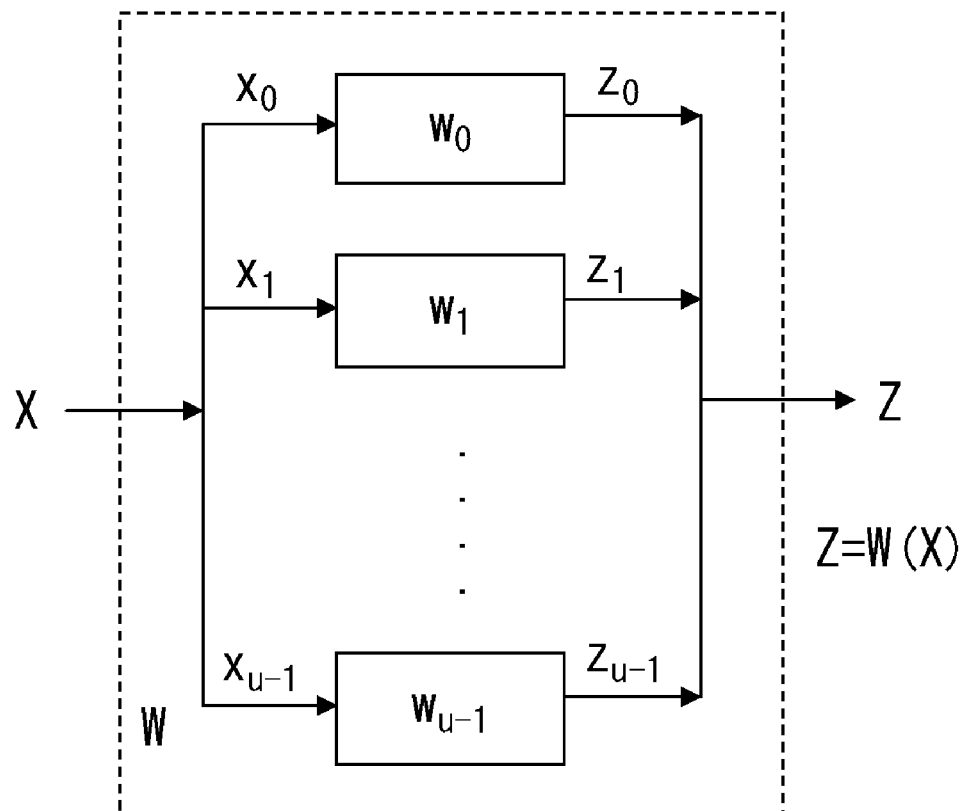
wj: NONLINEAR TRANSFORMATION TABLE (Sbox)
FOR TRANSFORMATION W, $W(X \oplus Y) \neq W(X) \oplus W(Y)$
F I G. 9

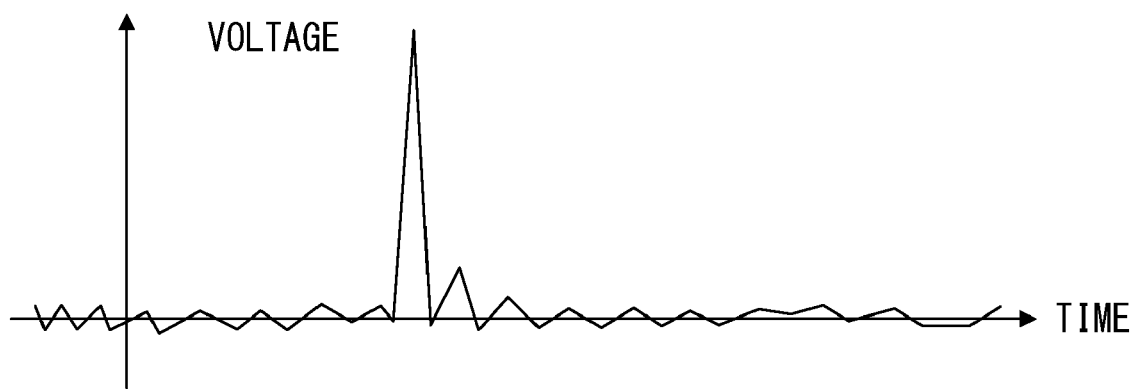
F I G. 1 3 A

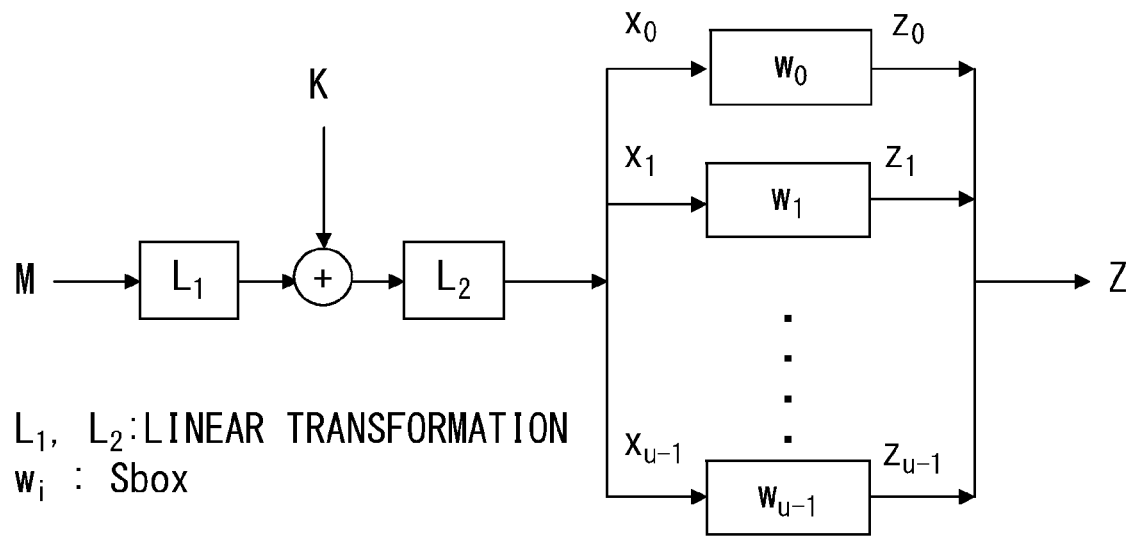
F I G. 1 4

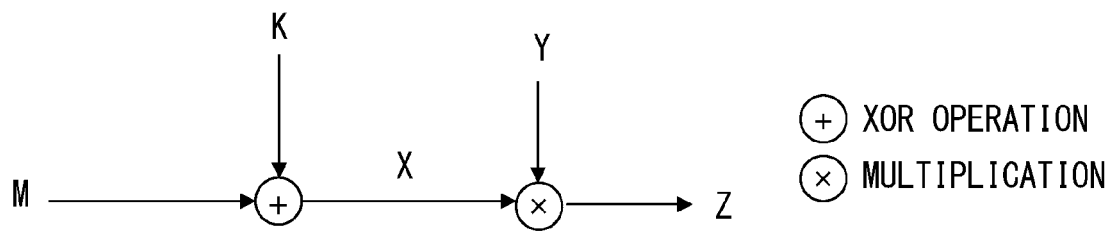
M : VALUE (SUCH AS PLAINTEXT, ETC.) Known TO ATTACKER
K : VALUE (KEY) Unknown TO ATTACKER
X : M⊕K
Y : VALUE (INTERNAL DATA) Unknown TO ATTACKER
Z : X⊗Y
F I G. 1 6

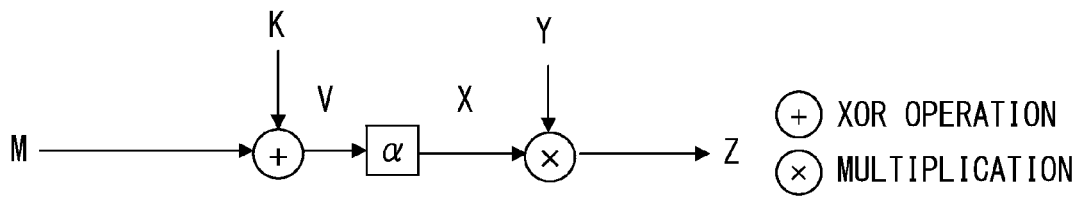
M : VALUE (PLAINTEXT, ETC.) Known TO ATTACKER
K : VALUE (KEY) Unknown TO ATTACKER
V : M⊕K
α : ARBITRARY FUNCTION (LINEAR, NONLINEAR) BY WHICH ATTACKER CAN CALCULATE INVERSE TRANSFORMATION $α^{-1}(0)$
X : α(M⊕K)
Y : VALUE (INTERNAL DATA) Unknown TO ATTACKER
Z : X⊗Y
F I G. 1 7

- INVERSE ELEMENT CALCULATION METHOD USING TABLE
  (NORMAL METHOD)
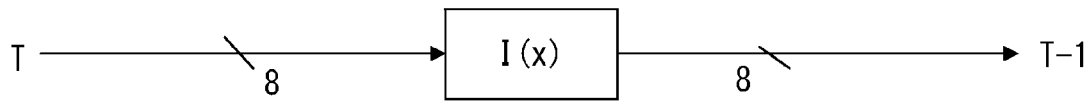
CIRCUIT SCALE IS LARGE SINCE 8-BIT INPUT/OUTPUT
TRANSFORMATION TABLE IS USED
- SIZE OF TRANSFORMATION TABLE IS
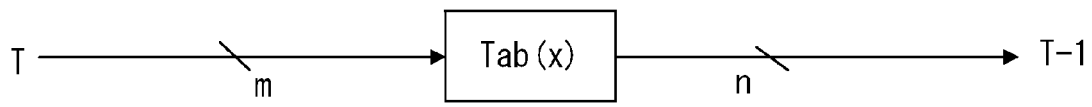
SIZE OF m-BIT INPUT n-BIT OUTPUT TABLE:
PROPORTIONAL TO $mn2^m$
SIGNIFICANT CHALLENGE OF REDUCING INPUT/OUTPUT
BIT LENGTH OF TRANSFORMATION TABLE
FIG. 22

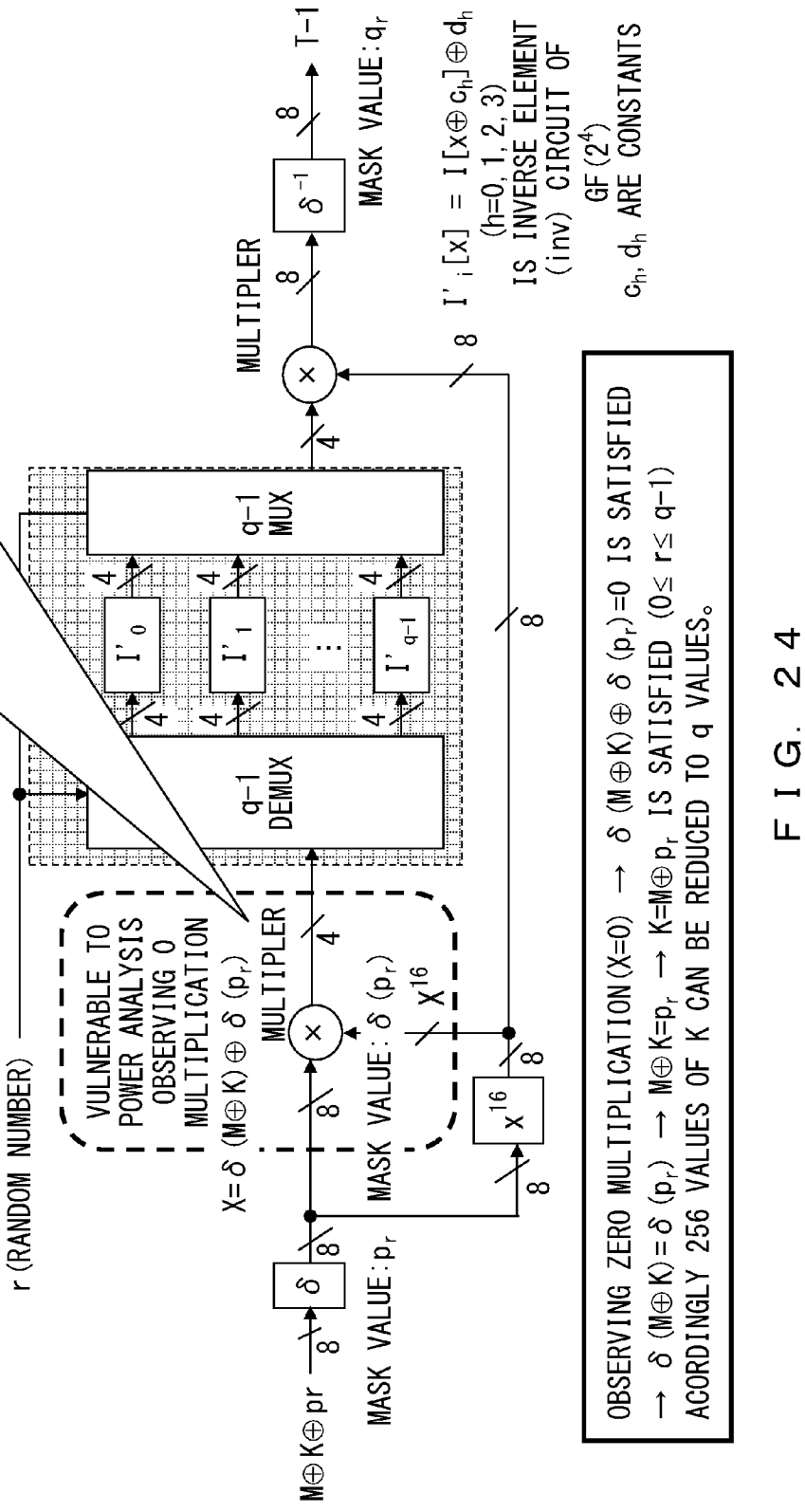
F I G. 24

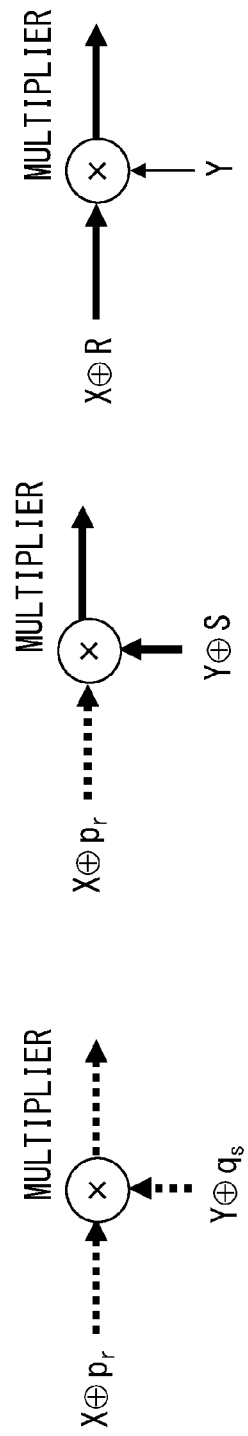
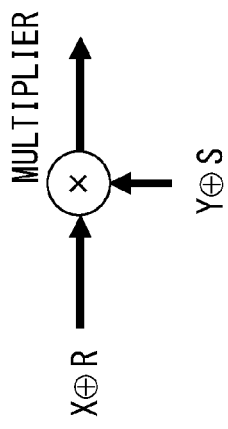
FIG. 25

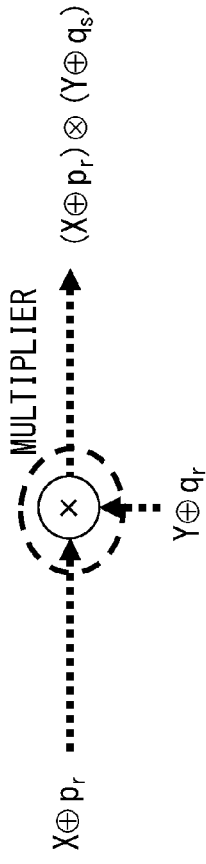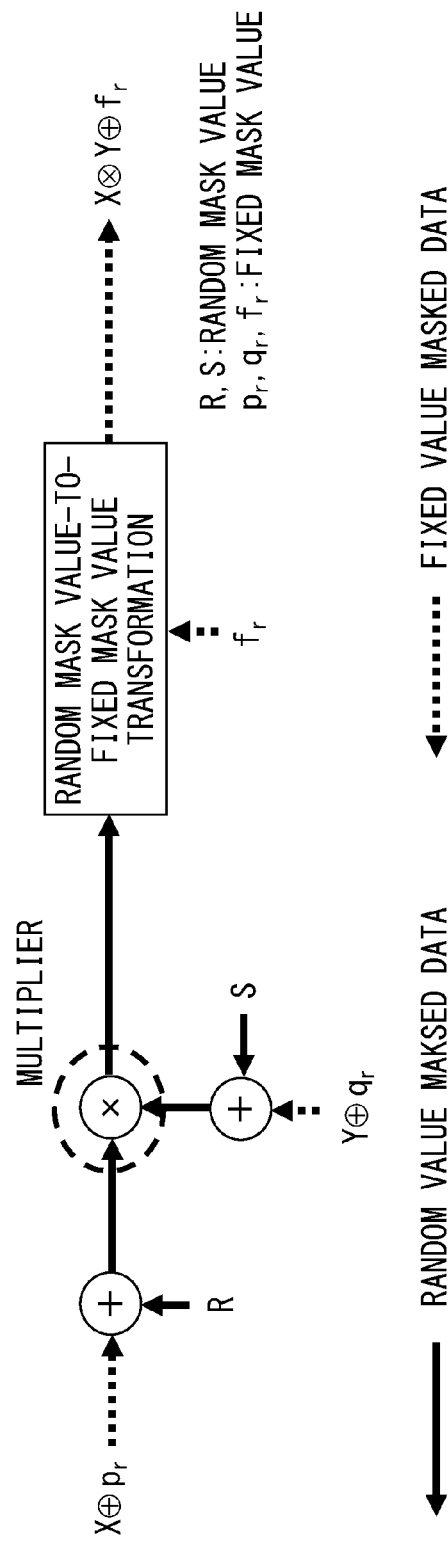
FIG. 26

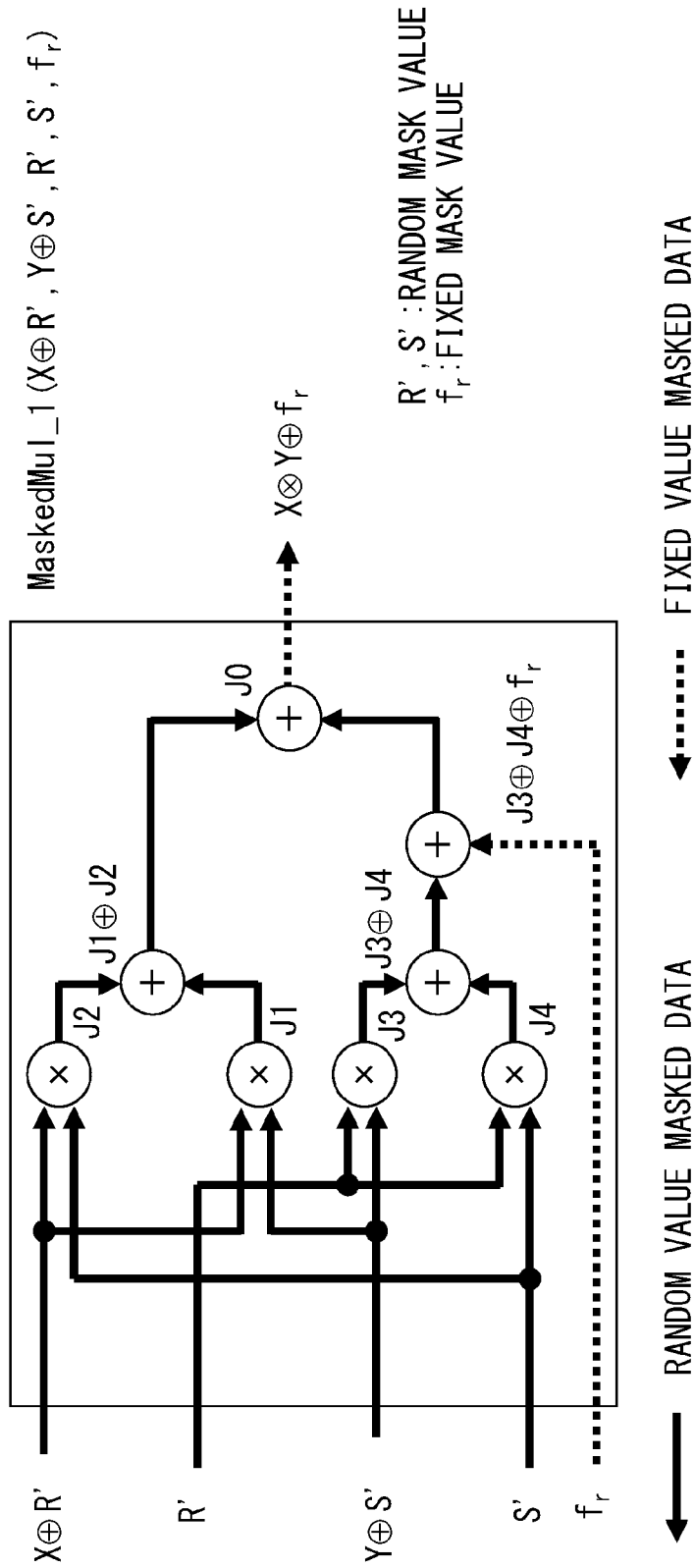
F I G. 27

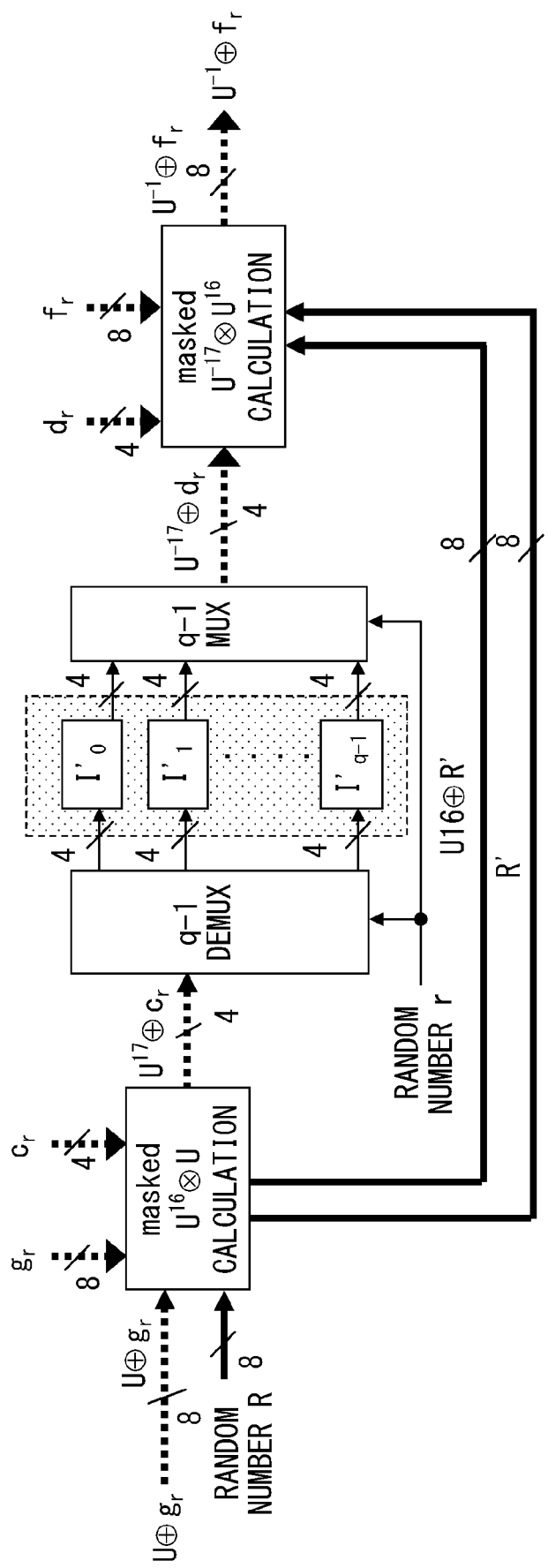
F I G. 31

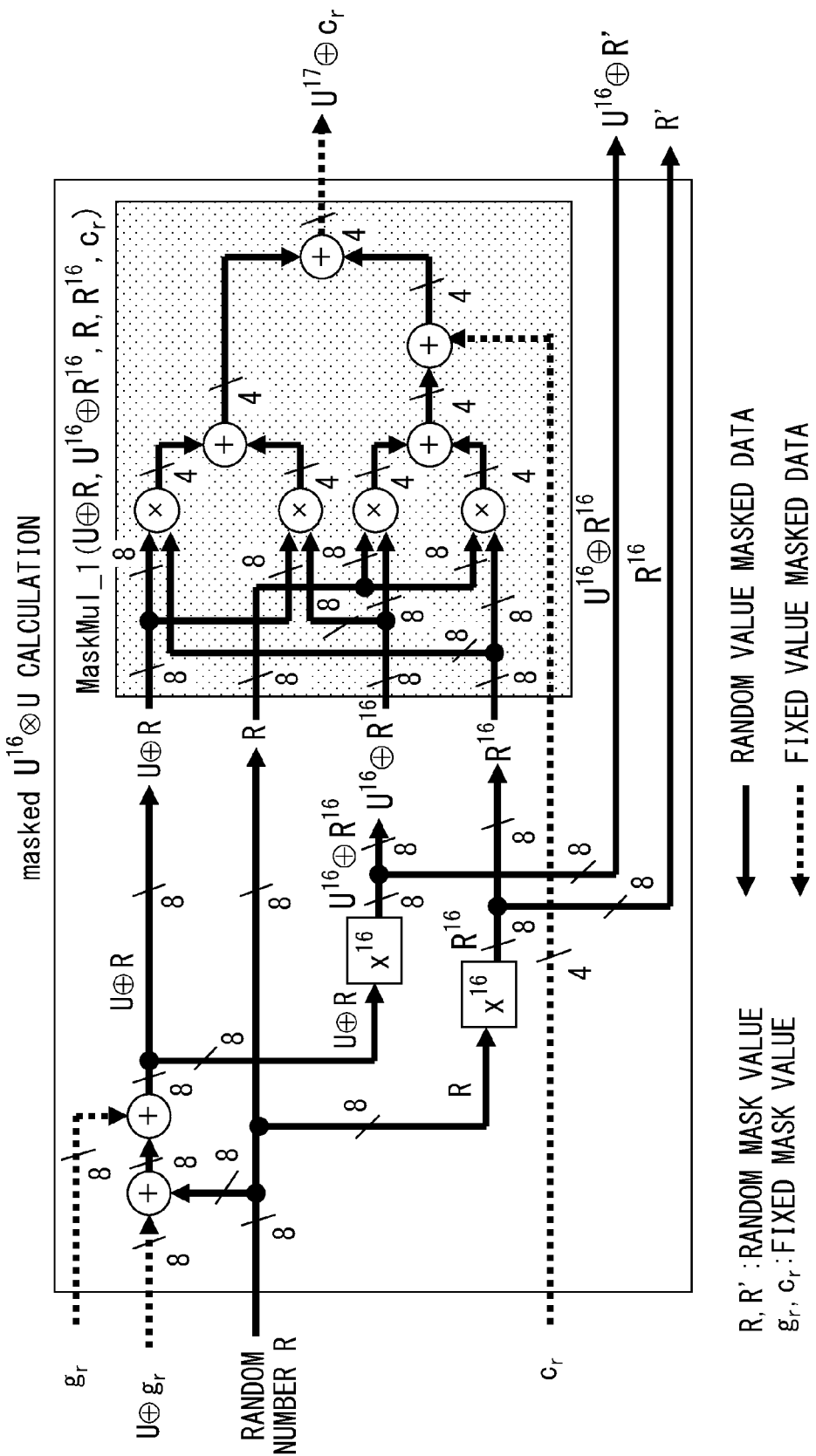
F I G. 32

ENCRYPTION APPARATUS HAVING COMMON KEY ENCRYPTION FUNCTION AND EMBEDDED APPARATUS

CROSS-REFERENCE TO RELATED APPLICATION

This application is a continuation application of International PCT Application No. PCT/JP2008/000837 which was filed on Mar. 31, 2008, the entire contents of which are incorporated herein by reference.

FIELD

The present invention relates to an encryption field, and more particularly, to a countermeasures technique for preventing cryptanalysis called a power analysis attack.

BACKGROUND

Encryption methods are broadly classified into a public key encryption method and a common key encryption method. The public key encryption method is a method using different keys for encryption and decryption. This is a method for securing safety by making a key (secret key) for decrypting an encrypted text secret only to a receiver although a key (public key) for encrypting a text is made public. In contrast, the common key encryption method is a method using the same key (secret key) for both encryption and decryption. This is a method for securing safety by implementing the secret key as information unknown to third parties except for a transmitter and a receiver.

Techniques in the encryption field include cryptanalysis. Cryptanalysis is a technique for estimating secret information such as a secret key or the like on the basis of obtainable information such as an encrypted text or the like. Cryptanalysis includes various techniques. A method called a power analysis attack (hereinafter referred to as PA) is a technique that has been recently receiving attention. PA is a technique devised by Paul Kocher in 1998. This is a technique for estimating key information within an encryption processor by collecting/analyzing power consumption data when various pieces of input data are given to the encryption processor included in an embedded apparatus such as a smart card or the like. It is known that a secret key can be estimated from an encryption processor by using PA in both public key encryption and secret key encryption.

PA includes two types of analyses such as a single power analysis (hereinafter referred to as SPA), and a differential power analysis (hereinafter referred to as DPA)). SPA is a method for estimating a secret key on the basis of a characteristic of single piece of power consumption data in an encryption processor, whereas DPA is a method for estimating a secret key by analyzing differences among many pieces of power consumption data. Normally, DPA is said to be stronger analysis. The following paper was announced as a representative of cryptanalysis using SPA and DPA. Documents such as Non-Patent Document 1 listed below describe cryptanalysis using DPA for public key encryption such as RSA or the like. Moreover, Non-Patent Document 2 listed below describes cryptanalysis using SPA and DPA for DES (Data Encryption Standards) currently used as a standard in common key encryption methods. In addition to DES, also Rijndael that is a common key encryption method is expected to be used as a standard in the next generation, and documents such as Non-Patent Document 3 listed below and the like point out the possibility of decryption using DPA.

Cryptanalytic technology using PA has been receiving attention as an especially effective method, and diverse cryptanalytic methods have been studied. Not only cryptanalytic technology but also countermeasures for preventing cryptanalysis using PA has made a progress, and has been focused as important technology as well as cryptanalytic technology.

FIG. 1 illustrates a normal configuration of a common key encryption process. Normally, the common key encryption process is composed of two processes such as a round process and expanded key generation. With the expanded key generation, a plurality of pieces of data called expanded keys (hereinafter denoted as expanded key 0, expanded key 1, . . . , expanded key N) are generated from an input secret key, and the generated data are output to the round process. By inputting these expanded keys and a plaintext to the round process, a transformation for encryption is performed, and an encrypted text is output.

AES (Advanced Encryption Standards) is known as a representative common key encryption algorithm, and AES is made public as Non-Patent Document 4 listed below.

FIG. 2 illustrates a configuration of AES.

AES is an algorithm using 128 bits as an encryption unit. Namely, a 128-bit encrypted text is generated from a 128-bit plaintext. A secret key is selectable from among three types such as 128 bits, 192 bits and 256 bits. By executing the expanded key process, N+1 128-bit expanded keys are generated from a secret key. An AES round process is composed of four types of processes such as RoundKey, Subbyte, ShiftRow and MixColumn. In RoundKey among them, an expanded key is used. A plaintext is input to the round process, which is repeated by N−1 times in order of RoundKey, Subbyte, ShiftRow and MixColumn. Then, the processes of RoundKey, Subbyte, ShiftRow and RoundKey are executed to output an encrypted text. The number of repetitions N varies depending on a bit length of a secret key. For 128 bits, N=10. For 192 bits, N=12. For 256 bits, N=14. FIGS. 3 to 6 illustrate the RoundKey process, the Subbyte process, the MixColumn process, and the ShiftRow process, respectively.

<Secret Key Cryptanalytic Method Using DPA>

A secret key cryptanalytic method using DPA is described below. DPA is a method for cryptanalyzing a secret key by measuring power consumed for the round process of FIG. 1. A process configuration of enabling cryptanalysis of a secret key by using DPA in common key encryption is described below without restricting to AES. Normal common key encryption is implemented by configuring the round process with a combination of an expanded key XOR process (FIG. 7), a linear transformation process (FIG. 8) and a nonlinear transformation process (FIG. 3), and by repeating the round process by a plurality of times. As illustrated in FIG. 7, the expanded key XOR process is a process for outputting a computation result Z of an exclusive OR (XOR) operation of input data X with an expanded key K. FIG. 8 illustrates the linear transformation process. This is a process for outputting Z that satisfies Z=L (X) where X is input data. At this time, L satisfies the following equation where X and Y are arbitrary values.

$$L(X \oplus Y) = L(X) \oplus L(Y)$$

(In the following description, the symbol $\oplus$ is replaced with $\bigcirc$)

Specifically, a bit permutation process like ShiftRow illustrated in FIG. 6, a matrix operation like MixColumn illustrated in FIG. 5, and other operations correspond to this equation. FIG. 9 illustrates the nonlinear transformation process. This is a process for outputting Z that satisfies Z=W(X) where X is input data. At this time, W does not satisfy (namely, nonlinear) an equation $W(X \bigcirc Y) = W(X) \bigcirc W(Y)$ where X and Y are arbitrary values. Specifically, this process is implemented with a nonlinear transformation table index called Sbox in many cases. Input X is divided into u pieces $(X = x_0 x_1 \ldots x_{u-1})$, represented by $z_j = w_j(x_j)$ is calculated by using Sbox $w_j$, and Z is output by being again combined as $Z = z_0 z_1 \ldots z_{u-1}$.

A cryptanalyzing method using DPA for common key encryption implemented by combining the above described processes is described next.

An example where the expanded key K can be decrypted by using DPA for a process of FIG. 10 implemented by combining the processes of FIGS. 7 and 9 is described as the simplest example. The configuration illustrated in FIG. 10 is equivalent to the structure implemented by combining RoundKey (FIG. 3) and Subbyte (FIG. 4) of AES.

FIG. 11 illustrates a configuration implemented by extracting only a bit related to an input/output of $W_j$ from the configuration illustrated in FIG. 10. In FIG. 11, assume that $m_j$, $k_j$ and $w_j$ are a known value such as a plaintext or the like, an unknown value, and a known Sbox table, respectively. Estimation of the expanded key $k_j$ by using DPA is described based on this assumption.

DPA is composed of two stages such as a measurement of power consumption data, and an expanded key analysis using differential power data. With the measurement of power consumption data, data of power consumption of an encryption processor when a plaintext is given is measured as a power consumption curve illustrated in FIG. 12 with an oscilloscope or the like. Such a measurement is repeated while varying the value of a plaintext, and the measurement is terminated when data of a sufficient number of measurements is obtained. A set of power consumption curves obtained with this series of measurements is defined as G.

The expanded key analysis using power consumption curves is described next. Assume $k_j = k'_j$ for the expanded key $k_j$ used in the encryption process. Since $m_j$ and $w_j$ are known, the set G can be classified into the following two types of subsets such as $G_0(k'_j)$ and $G_1(k'_j)$ in accordance with the e-th bit value of assumed $w_j(m_j \bigcirc k'_j)$.

$$G_0(k'_j) = \text{eth bit value of } \{G | z_j = w_j(m_j \bigcirc k'_j) = 0\} \quad (1)$$

$$G_1(k'_j) = \text{eth bit value of } \{G | z_j = w_j(m_j \bigcirc k'_j) = 1\} \quad (2)$$

Then, the following differential power curve $DG(k'_j)$ is created.

$$DG(k'j) = (\text{average of power consumption curves belonging to the subset } G_1) - (\text{average of power consumption curves belonging to the subset } G_0) \quad (3)$$

If this assumption is correct, namely, if $k'_j = k_j$, a spike illustrated in FIG. 13A appears. If this assumption is incorrect, namely, if $k'_j \neq k_j$, a flat curve where a spike does not appear is obtained as illustrated in FIG. 13B. Accordingly, if the differential power curve illustrated in FIG. 13A is obtained from the assumed $k'_j$, it means that the expanded key $k_j$ can be cryptanalyzed. By performing such cryptanalysis of $k_j$ for each j, the expanded key illustrated in FIG. 10 can be finally decrypted. This cryptanalysis is repeated for expanded key 0, expanded key 1, . . . , expanded key N, whereby a secret key can be decrypted. For AES, the initial value of an expanded key is the value of a secret key unchanged in terms of the nature of the algorithm. Therefore, by decrypting the expanded key 0 if the secret key is 128 bits, or by decrypting the expanded keys 0 and 1 if the secret key is 256 bits, the entire secret key can be decrypted.

The reason why the spike appears in the differential power curve $DG(k'_1)$ if $k'_j = k_j$ is described next. If $k'_j = k_j$, an equation (4) is satisfied for $Z_j$ when G is classified into $G_0(k'_j)$ and $G_1(k'_j)$ according to the equations (1) and (2).

$$(\text{average hamming weight of } z_j \text{ belonging to } G_1) - (\text{average hamming weight of } z_j \text{ belonging to } G_0) = 1 \quad (4)$$

In the meantime, if $k'_j \neq k_j$, the equation (4) is not satisfied, and the set G is randomly classified. Therefore, an equation (5) is satisfied.

$$(\text{average hamming weight of } z_j \text{ belonging to } G_0) - (\text{average hamming weight of } z_j \text{ belonging to } G_0) = 0 \quad (5)$$

A hamming weight is the number of bits having a value "1" when a certain value is represented with bit values. For example, the hamming weight of a bit value $(1101)_2$ is 3.

Accordingly, a difference occurs between average hamming weights of the load value $z_j$ of $G_1(k'_j)$ and $G_0(k'_j)$ if the equation (4) is satisfied. However, if the equation (5) is satisfied, a difference does not occur between the average hamming weights of the load value $z_j$ of $G_1(k'_j)$ and $G_0(k'_j)$.

Normally, power consumption is considered to be proportional to a hamming weight of a data value. Experimental results that prove this to be correct are referred to in documents such as Non-Patent Document 5 listed below and the like.

Accordingly, if $k'_j = k_j$, a difference of power consumption appears as a spike in a differential power curve when the equation (4) is satisfied. However, a spike does not appear and a differential power curve becomes flat when the equation (5) is satisfied.

DPA against the simplest structure illustrated in FIG. 10 has been described. However, it has been proved that such a method can be implemented even if the linear transformation of FIG. 9 is inserted.

FIG. 14 illustrates a structure implemented by generalizing the structure of FIG. 10. This is a processing structure implemented by inserting two linear transformation processes $L_1$ and $L_2$ before and after the key XOR process. By respectively implementing $L_1$, $L_2$, and $w_j$, for example, as a function of outputting an input unchanged, a bit permutation function, and Sbox called a B function of SC2000, FIG. 14 illustrates a structure equivalent to SC2000. For specifications of SC2000, see Non-Patent Document 6 listed below. Since $L_2$ is a bit permutation function, the process of FIG. 14 can be transformed into the same process as that of FIG. 11 by considering the structure obtained by extracting only a bit related to an input/output of $w_j$, and an expanded key K can be decrypted by using DPA similar to the above described one.

With the above described method, DPA is applied by focusing an Sbox output during the linear process. In addition, a method for applying DPA by focusing a value obtained immediately after XORing an input $m_j$ and a key $k_j$ (output value of the XOR process of a key) or an input value $x_j$ to the Sbox is known (Non-Patent Document 7 listed below).

In summary, the secret key K is estimated with DPA if the following conditions are satisfied (these DPA attack conditions are referred to also in Patent Document 1 listed below).

DPA-1. If an input M is known and controllable, the key K is unknown and fixed and a transformation of Sbox $w_j$ is known, DPA can be performed by measuring a power consumption curve of a portion A (output of Sbox $w_j$) illustrated in FIG. 15.

DPA-2. If the input M is known and controllable and the key K is unknown and fixed, DPA can be performed by measuring a power consumption curve of a portion B (a write of the output of the XOR process of a key) illustrated in FIG. 15.

DPA-3. If the input M is known and controllable and the key K is unknown and fixed, DPA can be performed by measuring a power consumption curve of a portion C (loading of an input value for indexing Sbox $w_j$) illustrated in FIG. 15.

<Secret Key Decryption Method Using SPA>

A secret key decryption method using SPA is described below. This attack observes power consumption of a multiplication process represented by $$c = a \otimes b$$

($\otimes$ is a symbol that represents a multiplication. The symbol $\otimes$ is hereinafter replaced with $\odot$ in this specification) where $\otimes$ is a symbol that represents a multiplication. In an AES process, a multiplication process when a, b and c are an element of $GF(2^8)$ or $GF(((2^2)^2)^2)$ is executed in a calculation (FIG. 23) of a composite field to be described later. If "0" is input to as b that is input data, a multiplication by 0, namely, an operation of $0 = 0 \odot b$ or $0 = a \odot 0$ is performed (hereinafter referred to as a zero multiplication). If a comparison is made between a power consumption waveform of the zero multiplication and a power consumption waveform of a multiplication if a and b are not zero (hereinafter referred to as a non-zero multiplication), it is known that the former becomes a very special waveform. Namely, a distinction can be made with SPA between the zero multiplication and the non-zero multiplication in the multiplication process. By using this nature, a secret key can be decrypted. This attack is referred to as zero multiplication SPA. The zero multiplication SPA is an attack method that can be executed only for an encryption processing apparatus using a multiplication process in its nature. For AES, this attack method can be executed only for an encryption processing apparatus using the Subbyte process implemented with a calculation (FIG. 23) of a composite field to be described later, and this attack cannot be performed for other encryption processing apparatuses.

FIG. 16 illustrates a circuit configuration of an encryption process that can be attacked with the zero multiplication SPA.

In FIG. 16, M is a value, such as a plaintext or the like, known to an attacker, and K is a value, such as a key or the like, unknown to the attacker. After the XOR operation of $X = M \bigcirc K$ is performed, a multiplication process $Z = X \odot Y$ with data Y is performed. The value of Y is a value unknown to the attacker. The attacker observes this operation with SPA, and observes whether or not the zero multiplication occurs in the operation of $X \odot Y$ while changing the value of M. If the zero multiplication is observed, X=0. Namely, since $M \bigcirc K = 0$ is proved, K=M, namely, the unknown K is proved to match M. As a result, K can be decrypted. To successfully perform this attack, the value of Y needs to be an arbitrary value other than "0".

The zero multiplication SPA can be performed also for the circuit configuration illustrated in FIG. 17.

In FIG. 17, M is a value, such as a plaintext or the like, known to an attacker, and K is a value, such as a key or the like, unknown to the attacker. $\alpha$ is an arbitrary transformation function. The transformation may be either linear or nonlinear as long as an attacker can perform an inverse transformation $\alpha^{-1}(0)$ for zero (namely, z that satisfies $\alpha(z)=0$). After the XOR operation $V = M \bigcirc K$ and an operation $X = \alpha(V)$ are performed, the multiplication process $Z = X \odot Y$ by data Y is performed. The value of Y is a value unknown to the attacker. The attacker observes this process with SPA, and observes whether or not the zero multiplication occurs in the operation of $X \odot Y$ while changing the value of M. If the zero multiplication is observed, X=0. Namely, since $\alpha(M \bigcirc K)=0$, $M \bigcirc K = z$ is proved. That is, $K = M \bigcirc z$ is proved, and K can be therefore decrypted.

<Conventional Techniques>

As conventional DPA countermeasures, there is a technique for randomizing power consumption by taking countermeasures for an encryption process. The following two conventional examples are known as countermeasures using this technique. These examples are described below as conventional examples 1 and 2. Moreover, a method for reducing a Subbyte circuit in an AES circuit without DPA countermeasures is described in the following conventional example 3. The Subbyte circuit is implemented not with the multiplication process but with a table operation in the conventional examples 1 and 2. Therefore, these examples are safe from the zero multiplication SPA, and the DPA countermeasures to be taken functions as PA countermeasures unchanged.

Conventional Example 1

As a typical method for randomizing power consumption, a technique called a masking method is known (Non-Patent Document 8 listed below. Hereinafter referred to as the conventional example 1). Assuming that data calculated in an encryption process without DPA countermeasures is M, DPA countermeasures referred to in the conventional example 1 is a method for executing an encryption process by calculating data M' and R represented by $M' = M \bigcirc R$ instead of calculating data M. Note that R is a random number, which is a value generated each time the encryption process is executed. With this method, data of the encryption process is masked with a random value. Because data is randomized, also power consumption is randomized. As a result, the process safe from PA can be implemented. In the following description, a value such as R, XORed with data without PA countermeasures, is called a mask value.

FIG. 19 illustrates an AES circuit to which the DPA countermeasures in the conventional example 1 is applied in contrast with the AES circuit of FIG. 19, to which the DPA countermeasures is not applied. In this circuit, two pieces of random data $M_i'$ and $R_i$, which satisfy $M_i' = M_i \bigcirc R_i$ where $R_i$ is a random number, are calculated as a replacement for the data $M_i$ calculated in FIG. 18. Since a data value calculated for each encryption process is random, the process safe from DPA can be implemented. However, since both pieces of data $M_i'$ and $R_i$ need to be calculated, the circuit scale increases (approximately double the scale of FIG. 18). In FIG. 18, the AES Subbyte process is executed with a table reference process using a static transformation table S[x] ($0 \leq x \leq 255$) implemented with fixed data. The transformation table S[x] used in the Subbyte process is called Sbox. In contrast, table data S'[x], represented by $S'[x] = S[x \bigcirc Rin] \bigcirc Rout$, of Sbox used in FIG. 19 needs to be dynamically updated according to random numbers $R_{in}$ and $R_{out}$ respectively for x=0, 1, . . . , 255. This update process needs 256 cycles. Therefore, this process has a disadvantage of slowing down processing speed compared with the circuit of FIG. 18.

Problems of the Conventional Example 1

Problem 1: A circuit scale is large compared with a circuit without DPA countermeasures Problem 2: Processing speed is slow compared with a circuit without DPA countermeasures Conventional Example 2

A method for solving the problem 2 of the conventional example 1 is disclosed by Patent Document 1 listed below (hereinafter referred to as the conventional example 2 in this specification). A mask value is generated at random in the conventional example 1, whereas a value selected with a random number among a plurality of fixed values calculated in advance is used as a mask in the conventional example 2.

The selected mask value is denoted as $R_i$. In the conventional example 2, data $M'_i$ and $R_i$ that satisfy $M'_i=M_i \bigcirc R$, are calculated in a similar manner as in the conventional example 1. Since $R_i$ is a value calculated in advance, there is no need to calculate both $M'_i$ and $R_i$. Only $M'_i$ needs to be calculated. Since a random number is a value calculated in advance, there is no need to dynamically update the table data of Sbox unlike the conventional example 1. Only a plurality of pieces of static data calculated in advance need to be prepared. Therefore, a faster process than the conventional example 1 can be implemented. By using the DPA countermeasures of the conventional example 2, the AES encryption process without DPA countermeasures illustrated in FIG. 18 is replaced with an encryption process illustrated in FIG. 20 described below.

FIG. 20 is described. q-1 MUX represents a selector, which selects one of q pieces of input data with a random number. q-1 DEMUX represents a demultiplexer, which selects one of q output destinations with a random number for input data.

An XOR process using an expanded key $K_i$, the Subbyte process using Sbox, the ShiftRow process and the MixColumn process are executed for input data $M'_i$, and data $M'_{i+1}$ is output. In this series of processes, one of q fixed values is selected with a random number r ($0 \leq r \leq q-1$), and a masking process is executed with this value. For example, if the q fixed values are denoted as $c_h$ (h=0, 1, ... q-1), a fixed value selected with the random number r is denoted as $c_r$. If input data in the process without the DPA countermeasures is denoted as $M_i$, $M'_i=M_i \bigcirc f_r$ is satisfied for a fixed value $f_r$ selected with the random number r. Namely, $M_i'$ is XORed with $f_r$, and a mask value of $M_i$ is $f_r$.

After the expanded key $K_i$ is masked with the fixed value $e_r$ selected with the random number r, it is XORed with $M'_i$. The mask value of $M_i'$ is $f_r$, and the mask value of the expanded key $K_i$ is $e_r$. Therefore, the mask value of data input to Sbox is represented as a result of XORing these mask values, and the mask value is $f_r \bigcirc e_r$. If $c_h=f_h \bigcirc e_h$ is represented for an arbitrary h (0, 1, ..., q-1), the mask value of data input to Sbox results in $c_r$.

A nonlinear transformation process is executed by the Sbox circuit next. This process is executed by selecting one of q Sboxes with a random number. Sbox executes a process for masking input data with $c_r$, and for masking output data with $d_r$. If Sbox with masking intended to implement this process is represented as $S'_h[x]$ and Sbox without countermeasures is represented as $S[x]$ in this process, $S'_h[x]$ (h=0, 1, ..., q-1) is designed so that a relationship of $S'_h[x]=S[x \bigcirc c_h] \bigcirc d_h$ is satisfied. Since a q-1 DEMUX circuit and a q-1 MUX circuit are respectively provided at an input and an output of the Sbox circuit, a signal of the expanded key XOR operation is transferred to only one of the q Sboxes. Power characteristics of the q Sboxes are mutually different. Therefore, by selecting one of the q Sboxes with a random number, power consumption is randomized, and the process safe from PA can be implemented. Unlike the conventional example 1, data calculated in advance is available for the Sbox table. Therefore, a faster process than the conventional example 1 can be implemented. However, the configuration of FIG. 20 needs an Sbox circuit by q times the circuit without countermeasures illustrated in FIG. 16. Since an Sbox circuit is normally very large in AES, there is a disadvantage that the circuit scale of the q Sboxes increases the entire AES circuit scale. Accordingly, the conventional example 2 has the following problem as well as the conventional example 1.

Problem of Conventional Example 2

Problem 1: A circuit scale is large compared with a circuit without DPA countermeasures.

Conventional Example 3

As a method for reducing the circuit scale of AES Sbox, a method using a composite field is known (Non-Patent Document 9 listed below. Hereinafter referred to as a conventional example 3). This method is known as a method applicable to an AES circuit without SPA or DPA countermeasures.

A normal configuration of an AES Sbox circuit is described as an assumption of explaining this method. FIG. 21 illustrates a configuration of the AES Sbox circuit referred to in "5.1.1 SubBytes ( ) Transformation" of Non-Patent Document 4 listed below. Encryption and Decryption circuits of the Sbox circuit are separately illustrated, and the Sbox circuit is composed of an inverse element function I(x) related to a remainder value of a polynomial $x^8+x^4+x^3+x+1$ of $GF(2^8)$, Affine transformation A(x), and Affine inverse transformation $A^{-1}(x)$ that is an inverse function of Affine transformation. GF( ) is a symbol that represents a Galois Field. Especially, a Galois field that is represented as $GF(2^\beta)$ by using an integer value $\beta$ is called a binary field. A Galois field that is represented as $GF((\ldots((2^{\beta1})^{\beta2})\ldots)^{\beta\gamma})$ by using $\gamma$ integer values $\beta1, \ldots, \beta\gamma$ is called a composite field. A Galois field is one type of a data representation form, and data represented in this data representation form is called an element. An element of a binary field is arbitrary data of $\beta$ bits, whereas an element of a composite field is arbitrary data of ($\beta1 \times \ldots \times \beta\gamma$) bits. An element of $GF(2^\beta)$ is only a data form of $\beta$ bits. An element of $GF((\ldots((2^{\beta1})^{\beta2})\ldots)^{\beta\gamma})$ corresponds to a data form of $\gamma$ types of bit lengths such as $\beta1$ bit, $\beta1 \times \beta2$ bits, ..., ($\beta1 \times \ldots \times \beta\gamma$) bits. As a bit length decreases, an operation process with a smaller circuit scale can be implemented. A multiplication ⊚, an XOR operation ◯, and a remainder operation mod(f(x)) using a polynomial f(x) are defined respectively for elements of a binary field and a composites field.

An inverse element is an 8-bit value y that satisfies $I(x)=x^{-1}$ mod $(x^8+x^4+x^3+x+1)$ where x is an arbitrary 8-bit value, and satisfies $x \otimes y=1 \mod(x^8+x^4+x^3+x+1)$. For the Affine transformation and the inverse element, also see "5.1.1 SubBytes( ) Transformation" of Non-Patent Document 4 listed below.

A(x) is used only for encryption, whereas $A^{-1}(x)$ is used only for decryption. I(x) is a common circuit used for both encryption and decryption. A(x) and $A^{-1}(x)$ are circuits that perform an 8-bit input/output operation with a simple logic operation, and their scales are known to be small. In contrast, I(x) is a circuit that performs an 8-bit input/output operation using a table, and its scale is known to be large. Namely, the configuration illustrated in FIG. 21 has a problem of reducing the circuit scale of I(x) that is a common circuit used for encryption and decryption. As a method for reducing the circuit scale of I(x), an inverse element calculation method using a composite field is proposed by Non-Patent Document 10 listed below. FIG. 22 illustrates a normal inverse element calculation circuit using the table, whereas FIG. 23 illustrates an inverse element calculation circuit using a composite field.

As illustrated in FIG. 22, the normal inverse element calculation circuit executes a process for transforming 8-bit input data into 8-bit output data by using the table. If this process is implemented as a circuit, the scale of the circuit becomes very large since an input/output of this circuit is 8 bits. It is known that the scale of a circuit for performing a table operation is proportional to $m \times n \times 2^m$ when m-bit input data is transformed into n-bit output data in the circuit (FIG.

22). To reduce the scale of the circuit, it is an important challenge of reducing both m and n that are input/output bit lengths. The inverse element operation circuit using a composite field illustrated in FIG. 23 achieves this challenge. In this circuit, a table of m=4 and n=4 is used. Comparing the size of the table of m=n=8 illustrated in FIG. 22 with that of the table of m=n=4 illustrated in FIG. 23, $(4\times4\times2^4)/(8\times8\times2^8)=(2^8)/(2^{14})=1/64$. Namely, the table illustrated in FIG. 23 is reduced to a size of 1/64 of the table illustrated in FIG. 22. Namely, the scale of the circuit can be reduced.

Contents of the process illustrated in FIG. 23 are described. In FIG. 23, an inverse element $T^{-1}$ of an element T of $GF(2^8)$ is calculated. To calculate $T^{-1}$ with a 4-bit input/output table, an element U of $GF(((2^2)^2)^2)$ is used. However, the element U of the composite field $GF(((2^2)^2)^2)$ is a remainder of polynomials $GF((2^4)^2)=x^2+x+(1100)_2$, $GF((2^2)^2)=x^2+x+(10)_2$, and $GF(2^2)=x^2+x+1$. Both T and U are 8-bit data. T and U are calculated with $U=\delta(T)$ and $U=\delta^{-1}(T)$ by performing a transformation called a δ transformation. δ and $\delta^{-1}$ transformations are matrix operations called an isomorphism function. For more details, see Non-Patent Document 11 listed below. After U is calculated from T with the δ transformation, $U^{16}$ and $U^{17}$ are calculated. $U^{17}$ is calculated by multiplying $U^{16}$ and U. As a result of this calculation, it is known that higher-order 4 bits result in 0000. Namely, $U^{17}$ is a value represented with not 8 bits but 4 bits. Also $U^{-17}$ that is an inverse element of $U^{17}$ is a value represented with 4 bits. Namely, an input/output of the table circuit that calculates $U^{-17}$ from $U^{17}$ can be reduced to 4 bits although the input/output is 8 bits according to the method illustrated in FIG. 22. After $U^{-17}$ is calculated with this table, $U^{-1}$ is calculated with $U^{-1}=U^{-17}\times U^{16}$. Lastly, $T^{-1}$ is calculated with $T^{-1}=\delta^{-1}(U^{-1})$.

The circuit illustrated in FIG. 23 is implemented by adding a 16th power circuit and a multiplication circuit instead of reducing the bit length of the table. It is known that the scales of these circuits are much smaller than that of the 8-bit input/output table of FIG. 22. Therefore, the circuit scale of the inverse element calculation circuit illustrated in FIG. 23 can be made smaller than the inverse element calculation circuit illustrated in FIG. 22. However, PA countermeasures is not taken in the conventional example 3, which has the following problem.

Problem of Conventional Example 3

Problem 3: A process safe from SPA and DPA cannot be implemented.

The following types of multiplications ⊚ using elements of $GF(2^8)$ and $GF(((2^2)^2)^2)$ are known. For the multiplication ⊚ and the XOR operation ○, laws represented as (law-1), (law-2), (law-3), and (law-4) are satisfied.

multiplication of $GF(2^8)$: Only the following one type is defined.

Only an 8-bit×8-bit multiplication defined by c=a⊚b is defined. All of a, b and c are 8-bit values.

multiplication of $GF(((2^2)^2)^2)$: The following three types are defined.

An 8-bit×8-bit multiplication defined by c=a⊚b. All of a, b and c are 8-bit values.

An 8-bit×4-bit multiplication defined by c=a⊚b. a and c are 8-bit values, and b is a 4-bit value.

A 4-bit×4-bit multiplication defined by c=a⊚b. All of a, b and c are 4-bit values.

(law-1) a⊚b=b⊚a where a and b are 8-bit or 4-bit data, and are elements of $GF(2^8)$ or $GF(((2^2)^2)^2)$.

(law-2) a⊚(b○c)=a⊚b○a⊚c where a, b and c are 8-bit or 4-bit data, and are elements of $GF(2^8)$ or $GF(((2^2)^2)^2)$.

(law-3) a○a=0 where a is 8-bit or 4-bit data, and is an element of $GF(2^8)$ or $GF(((2^2)^2)^2)$.

(law-4) a⊚b=$a_H$⊚b||$a_L$⊚b where a is 8-bit data, $a_H$ is higher-order 4 bits of a, $a_L$ is lower-order 4 bits of a, and b is 4-bit data. || is a symbol that represents a bit concatenation. For example, a bit value $(1110)_2$ is denoted as $(1110)_2=(11)_2||(10)_2$. Moreover, a relationship among a, $a_H$ and $a_L$ is denoted as a=$a_H$||$a_L$. a, $a_H$, $a_L$ and b are elements of $GF(((2^2)^2)^2)$.

(law-1) and (law-2) are laws that correspond to a communicative law a×b=b×a satisfied for an integer multiplication× and an integer addition+, and also correspond to an associative law a×(b+c)=a×b+a×c. These laws are satisfied for both $GF(2^8)$ and $GF(((2^2)^2)^2)$. (law-3) is evident from a definition 0○0=0, 1○1=0 of an XOR operation, and this law is satisfied for both $GF(2^8)$ and $GF(((2^2)^2)^2)$. (law-4) is a special law that is satisfied only for $GF(((2^2)^2)^2)$. This law indicates that a calculation result of an 8-bit×4-bit multiplication in $GF(((2^2)^2)^2)$ is obtained by concatenating bits of results of operations of two 4-bit×4-bit multiplications $a_H$⊚b and $a_L$⊚b.

For normal Galois fields except for $GF(2^8)$ and $GF(((2^2)^2)^2)$, (law-1), (law-2) and (law-3) are satisfied for an arbitrary binary field $GF(2^\beta)$ and an arbitrary composite field $GF((\ldots(2^{\beta 1})\ldots)^{\beta\gamma})$. (law-4) is satisfied if the composite field $GF((\ldots(2^{\beta 1})\ldots)^{\beta\gamma})$ satisfies βγ=2. Namely, a result of a⊚b conforms to (law-4) if a is (β1×...×βγ–1×2) bits and $a_H$, $a_L$ and b are (β1×...×βγ–1) bits.

Comparisons of the respective characteristics of the above described conventional examples 1 to 3 are summarized in Table 1. Table 1 includes the comparisons of three points such as safety from PA, a circuit scale and a processing speed. For the safety, "safer" is better. For the circuit scale, "smaller" is better. For the processing speed, "faster" is better. It is proved from Table 1 that the conventional examples 1 to 3 are not methods having superior characteristics of all the three points.

<Conventional Problems and Solutions>

Here, means of the present invention for achieving superior effects on all the three characteristics represented by Table 1 is described. To explain this means, a solution according to the present invention is described after a simple combination of the conventional examples 2 and 3 is explained. Initially, FIG. 24 illustrates one of simple combinations of the conventional examples 2 and 3.

FIG. 24 illustrates a circuit implemented by combining the conventional examples 2 and 3. The conventional example 2 has a problem in that the circuit scale of q Sboxes illustrated in FIG. 20 is large. Accordingly, FIG. 24 aims at reducing the scale of the Sbox circuit as the disadvantage of the conventional example 2 by replacing the Sboxes with a circuit of the composite field illustrated in FIG. 23. In a table index process of the inverse element calculation circuit illustrated in FIG. 23, the table selection technique of FIG. 20 using a random number is introduced.

Input data of FIG. 24 is M○K○$p_r$. This is a value obtained by masking a value, acquired by XORing a plaintext M with an expanded key K, with a fixed value $p_r$(0≤r≤q–1) selected with a random number r.

A value obtained by performing a δ transformation for the above described value is X=δ(M○K○$p_r$)=δ(M○K)○δ($p_r$). Namely, X is masked with a mask value δ($p_r$). Since δ and $\delta^{-1}$ transformations are linear transformations, they are functions that satisfy δ(a○b)=δ(a)○δ(b) and $\delta^{-1}$(a○b)=$\delta^{-1}$(a)○$\delta^{-1}$(b) where a and b are arbitrary values.

In FIG. 24, for a multiplier that performs a multiplication of X and $X^{16}$, 256 candidates of the key K can be reduced to q candidates by using the zero multiplication SPA. The value of q can be theoretically increased to infinity. However, if q is increased to a too large value, the circuit scale increases. Practically, the value of approximately q=4 is used. Namely, the 256 values of the key K can be reduced to 4 values. Therefore, the circuit illustrated in FIG. 24 is vulnerable to the zero multiplication SPA. An attack method thereof is described below.

An assumption of the attack is initially described. Assume that M is a value known to an attacker, K is a value unknown to the attacker, r is a value unknown to the attacker, and a set of q fixed values $p_0, p_1, \ldots p_{q-1}$ is values known to the attacker. A method of the zero multiplication SPA for the circuit illustrated in FIG. 24 is described based on this assumption.

A multiplier the power consumption of which is observed with the zero multiplication SPA can be observed with SPA if a zero multiplication by X=0 occurs. This SPA means X=0. Therefore, $\delta(M \bigcirc K) \bigcirc \delta(p_r)=0$, namely, $\delta(M \bigcirc K)=\delta(p_r)$ is proved to the attacker. By performing a $\delta^{-1}$ transformation for both sides, $M \bigcirc K=p_r$ is obtained. Accordingly, $K=M \bigcirc p_r$ is proved to the attacker. Namely, $K \bigcirc M=p_r$ is proved to the attacker for any of r=0, 1, . . . , q−1. Therefore, the values of K can be reduced to q values. Such a zero multiplication SPA is applicable not only to the multiplier of FIG. 24 that multiplies X and $X^{16}$ but also to a multiplier that multiplies $X^{16}$ and an output of the 4-bit table $I'_r[x]$.

As described above, the circuit illustrated in FIG. 24 is vulnerable to the zero multiplication SPA although data is randomized with a mask value $p_r$. This is because $p_r$ is a value (hereinafter referred to as a fixed mask value) that is selected with a random number from among q 8-bit fixed values. As a result, the 256 values of K can be reduced to q values. If an arbitrary 8-bit random value R is used as a mask value (hereinafter referred to as a random mask value) as a replacement for the fixed mask value $p_r$, an attacker cannot reduce candidates of K even though a zero multiplication is observed with SPA. The reason is as follows. Information that the attacker obtains when observing the zero multiplication is $K=M \bigcirc R$ instead of $K=M \bigcirc p_r$. At this time, R is an arbitrary 8-bit random value, which is unknown to the attacker. Therefore, the number of value candidates of K is not reduced to 256 or less.

As described above, it is concluded that the AES process using a composite field calculation is vulnerable to the zero multiplication SPA if data masked with a fixed mask value is input to the multiplier, and that the AES process is safe from the zero multiplication SPA if data masked with a random mask value is input. FIG. 25 is a schematic illustrating a condition for safety from the zero multiplication SPA for such a multiplication process.

In FIG. 25, X and Y are unmasked data, and are data calculated in the AES process without DPA and SPA countermeasures. $p_r$ and $q_s$ represent fixed mask values selected with random numbers r and s. R and S represent random mask values. A process for XORing the data X and Y calculated in the process without DPA and SPA countermeasures with the random mask values such as R and S is called random value masking, and resultant XORed data such as $X \bigcirc R$ and $Y \bigcirc S$ are called random value masked data. Similarly, a process for XORing the data X and Y calculated in the process without DPA and SPA countermeasures with fixed mask values such as $p_r$ and $q_s$ is called fixed value masking, and resultant XORed data $X \bigcirc p_r$ and $Y \bigcirc q_s$ are called fixed value masked data.

As illustrated in FIG. 25, a multiplication process safe from the zero multiplication SPA is a process for inputting random value masked data as two inputs a and b to the multiplication process represented by c=a⊚b. If a value that is not random value masked data is input as either or both of the two inputs a and b to the multiplication, the process is vulnerable to the zero multiplication SPA. If both of a and b are fixed value masked data like $c=(X \bigcirc p_r) \otimes (Y \bigcirc q_s)$, if only b is random value masked data like $c=(X \bigcirc p_r) \otimes (Y \bigcirc S)$, or if only a is random value masked data like $c=(X \bigcirc R) \otimes Y$, the process is vulnerable to the zero multiplication SPA in all the cases. As a result, the condition for realizing a process safe from the zero multiplication SPA is represented by the following (ZSPA-sec).

(ZSPA-sec) The multiplication process safe from the zero multiplication SPA is an operation for inputting random value masked data as both of the two inputs a and b to the multiplication process represented by c=a⊚b.

The following document group is known examples cited in this specification.

[Non-Patent Document 1] Thomas S. Messerges, Ezzy A. Dabbish and Robert H. Sloan "Power Analysis Attacks of Modular Exponentiation in Smartcards", Cryptographic Hardware and Embedded Systems (CHES'99), Springer-Verlag, pp. 144-157

[Non-Patent Document 2] Paul Kocher, Joshua Jaffe, and Benjamin Jun, "Differential Power Analysis," in proceedings of Advances in Cryptology-CRYPTO'99, Springer-Verlag, 1999, pp. 388-397

[Non-Patent Document 3] S. Chari, C. Jutla, J. R. Rao, P. Rohatgi, "An Cautionary Note Regarding Evaluation of AES Candidates on Smart-Cards," Second Advanced Encryption Standard Candidate Conference, March 1999

[Non-Patent Document 4] US NIST (National Institute of Standards and Technology), FIPS197 (Federal Information Processing Standards Publication) http://csrc.nist.gov/publications/fips/fips197/fips-197.pdf

[Non-Patent Document 5] T. S. Messerge, Ezzy A. Dabbish and Robert H. Sloan, "Investigations of Power Attacks on Smartcards". Proceedings of USENIX Workshop on Smartcard Technology, March 1999.

[Non-Patent Document 6] Takeshi Shimoyama, Hitoshi Yanami, Kazuhiro Yokoyama, Masahiko Takenaka, Kouichi Itoh, Jun Yajima, Naoya Torii, Hidema Tanaka "The Block Cipher SC2000", Fast Software Encryption (FSE 2001), pp. 312-327, LNCS vol. 2355

[Non-Patent Document 7] M. Akkar, R Bevan, P. Dischamp, and D. Moyart, "Power Analysis, What Is Now Possible . . . .", Asiacrypt 2000)

[Non-Patent Document 8] Thomas S. Messerges, "Securing the AES Finalists Against Power Analysis Attacks," in proceedings of Fast Software Encryption Workshop 2000, Springer-Verlag, April 2000.

[Non-Patent Document 9] Akashi Satoh, Sumio Morioka, Kohji Takano and Seiji Munetoh: "A Compact Rijndael Hardware Architecture with S-Box Optimization", ASIACRYPT2001, LNCS Vol. 2248, pp. 239-254, December 2001.

[Non-Patent Document 10] Akashi Satoh, Sumio Morioka, Kohji Takano and Seiji Munetoh: "A Compact Rijndael Hardware Architecture with S-Box Optimization", ASIACRYPT2001, LNCS Vol. 2248, pp. 239-254, December 2001.

[Non-Patent Document 11] "A Compact Rijndael Hardware Architecture with S-Box Optimization"

[Patent Document 1] Japanese Laid-open Patent Publication No. 2002-366029

SUMMARY

As described above, if the conventional examples are simply combined, an AES encryption apparatus that can solve the aforementioned problems 1, 2 and 3 and has SPA and DPA countermeasures cannot be implemented.

The present invention is an implementation technique for taking PA countermeasures for an encryption processor for performing common key encryption. By using this technique, it becomes difficult to cryptanalyze a secret key of an encryption process such as AES that is a representative common key algorithm, and safety of an embedded device such as a smart card or the like can be improved.

A first embodiment according to the present invention assumes a common key block encryption apparatus for performing a nonlinear transformation with a multiplication process executed in a binary field or a composite field.

Initially, the first embodiment includes a computing unit configured to execute computation processes other than the nonlinear transformation with fixed value masked input data obtained by performing an XOR operation (hereinafter referred to as XOR) with a mask using a fixed value (hereinafter referred to as a fixed mask value).

The first embodiment further includes, in the multiplication process using the nonlinear transformation, an XOR computing circuit configured to transform all pieces of input data into fixed value masked input data by XORing all the pieces of input data with a fixed mask value, and to transform the fixed value masked data into random value masked input data by XORing the input data with a mask using a random value (hereinafter referred to as a random mask value), a multiplier configured to execute a multiplication process on the basis of the random value masked input data output from the XOR computing circuit, and a random mask value-to-fixed mask value transformation circuit configured to again transform the random value masked output data output from the multiplier into fixed value masked output data.

A second embodiment according to the present invention has the following configuration based on the first embodiment according to the present invention.

Namely, the multiplication process in the first embodiment according to the present invention is configured with a computing circuit configured to compute $$J1 = (X \bigcirc R') \otimes (Y \bigcirc S')$$

$$J2 = S' \otimes (X \bigcirc R')$$

$$J3 = R' \otimes (Y \bigcirc S')$$

$$J4 = R' \otimes S'$$

$$J0 = J1 \bigcirc J2 \bigcirc J3 \bigcirc J4 \bigcirc f_r$$

and to compute an output $J0 = X \otimes Y \bigcirc f_r$, if it is assumed that input data of the multiplication process using the nonlinear transformation are X and Y, random mask values are R and S, a fixed mask value is $f_r$, $\bigcirc$ is an XOR operation circuit, $\otimes$ is a multiplier, and random mask values, such as $R' = R \bigcirc p_r$ and $S' = S \bigcirc q_r$, obtained by XORing the fixed mask value with a random number are R' and S', or the multiplication process is configured with a computing circuit equivalent to the computing circuit.

A third embodiment according to the present invention has the following configuration based on the first embodiment according to the present invention.

Namely, the multiplication process in the first embodiment according to the present invention is configured with a computing circuit configured to compute $$J1 = (X \bigcirc R') \otimes (Y \bigcirc R')$$

$$J2 = R' \otimes ((X \bigcirc R') \bigcirc (Y \bigcirc R') \bigcirc R')$$

$$J0 = J1 \bigcirc J2 \bigcirc f_r$$

and to compute an output $J0 = X \otimes Y \bigcirc f_r$, if it is assumed that input data of the multiplication process using the nonlinear transformation are X and Y, a random mask value is R, a fixed mask value is $f_r$, $\bigcirc$ is an XOR operation circuit, $\otimes$ is a multiplier, and a random mask value, such as $R' = R \bigcirc p_r$, obtained by XORing the fixed mask value with a random number is R', or the multiplication process is configured with a computing circuit equivalent to the computing circuit.

A fourth embodiment according to the present invention has the following configuration based on the first embodiment according to the present invention.

Namely, the multiplication process in the first embodiment according to the present invention is a computation performed in a composite field $GF((\ldots(2^{\beta 1})\ldots)^{\beta \gamma})$ that satisfies $\beta \gamma = 2$, and the multiplication process is configured with a computing circuit configured to compute $$J1 = (X \bigcirc R') \otimes (Y \bigcirc R'_L)$$

$$J2 = (Y \bigcirc R'_H) \otimes R'_H \bigcirc R'^2_H$$

$$J3 = ((X \bigcirc R') \bigcirc (Y \bigcirc R'_L) \bigcirc R'_L) \otimes R'_L$$

$$J0 = J1 \bigcirc (J2 \| (0000)_2) \bigcirc J3 \bigcirc f_r$$

and to compute an output $J0 = X \otimes Y \bigcirc f_r$, if it is assumed that input data of the multiplication process using the nonlinear transformation are X and Y, random mask values are R and S, a fixed mask value is $f_r$, $\bigcirc$ is an XOR operation circuit, $\otimes$ is a multiplier, random mask values, such as $R' = R \bigcirc p_r$ and $S' = S \bigcirc q_r$, obtained by XORing the fixed mask values with a random number, are R' and S', $R'_H$ and $R'_L$ are bit values obtained when R' is halved into higher-order and lower-order bits, and $J2 \| (0000)_2$ is a computation for concatenating a zero bit sequence including a same number of bits as J2 to a lower-order side of J2, or the multiplication process is configured with a computing circuit equivalent to the computing circuit.

A fifth embodiment according to the present invention has the following configuration based on the first embodiment according to the present invention.

Namely, the multiplication process in the first embodiment according to the present invention is a computation performed in a composite field $GF((\ldots(2^{\beta 1})\ldots)^{\beta \gamma})$ that satisfies $\beta \gamma = 2$. The multiplication process is configured with a computing circuit configured to compute $$J1 = (X_H \bigcirc R'_L) \otimes (Y \bigcirc R'_L)$$

$$J2 = ((X_H \bigcirc R'_L) \bigcirc (Y \bigcirc R'_L) \bigcirc R'_L) \otimes R'_L$$

$$J3 = (X_L \bigcirc R'_L) \otimes (Y \bigcirc R'_L)$$

$$J4 = ((X_L \bigcirc R'_L) \bigcirc (Y \bigcirc R'_L) \bigcirc R'_L) \otimes R'_L$$

$$J0 = ((J1 \bigcirc J2) \| (J3 \bigcirc J4)) \bigcirc f_r$$

and to compute an output $J0 = X \otimes Y \bigcirc f_r$, if it is assumed that input data of the multiplication process using the nonlinear transformation are X and Y, random mask values are R and S, a fixed mask value is $f_r$, $\bigcirc$ is an XOR operation circuit, $\otimes$ is a multiplier, random mask values, such as $R' = R \bigcirc p_r$ and $S' = S \bigcirc q_r$, obtained by XORing the fixed mask value with a random number, are R' and S', $R'_H$ and $R'_L$, are bit values obtained when R' is halved into higher-order bits and lower-order bits, and $X'_H$ and $X'_L$, are bit values obtained when $X'$ is halved into higher-order bits and lower-order bits, or the multiplication process is configured with a computing circuit equivalent to the computing circuit.

By using the computing circuit of the multiplication process in the second or the third embodiment according to the present invention, a $U^{16} \otimes U$ multiplication in a binary field or a composite field can be performed.

Additionally, by using the computing circuit of the multiplication process in the second, the fourth or the fifth embodiment, a $U^{-17} \otimes U^{16}$ multiplication in a binary field or a composite field can be performed.

A sixth embodiment according to the present invention has the following configuration by assuming a common key encryption apparatus for computing 8-bit output data $U^{-1} \bigcirc f_r$, 8-bit input data $U \bigcirc g_r$, in a composite field $GF((\ldots (2^{\beta 1}) \ldots)^{\beta \gamma})$ that satisfies $\beta \gamma = 2$ by using 4-bit $c_r$, 8-bit $g_r$, 4-bit $d_r$, and 8-bit $f_r$ as fixed mask values selected with a random number r, and by using 8-bit R and R' as random mask values.

Initially, the sixth embodiment includes a maskedU$^{16} \otimes U$ calculation circuit configured to calculate a 4-bit value $U^{17} \bigcirc c_r$ from the input data $U \bigcirc g_r$ with a $U^{16} \otimes U$ calculation for XORing with a random mask value, and to calculate 8-bit $U^{16} \bigcirc R'$ and R'.

The sixth embodiment further includes a 4-bit-to-4-bit transformation table circuit that is selected with a random number r, and configured to calculate 4-bit $U^{-17} \bigcirc d_r$ from the $U^{17} \bigcirc c_r$ output from the maskedU$^{16} \otimes U$ calculation circuit.

The sixth embodiment still further includes a masked $U^{-17} \otimes U^{16}$ calculation circuit, to which $U^{-17} \bigcirc d_r$ output from the 4-bit-to-4-bit transformation table circuit, $U^{16} \bigcirc R'$ output from the maskedU$^{16} \otimes U$ calculation circuit, and R' are input, and which is configured to calculate the output data $U^{-1} \bigcirc f_r$.

A seventh embodiment according to the present invention has the following configuration based on the sixth embodiment according to the present invention.

Namely, the maskedU$^{16} \otimes U$ calculation circuit includes a computing circuit group, to which the fixed mask value $g_r$, the input data $U \bigcirc g_r$, and the random mask value R are input, and which is configured to calculate three pieces of data such as $U \bigcirc R = (U \bigcirc g_r) \bigcirc R \bigcirc g_r$, $U^{16} \bigcirc R^{16} = (U \bigcirc R)^{16}$, and $R^{16}$, and a computing circuit group configured to perform a computation $$J1=(U \bigcirc R) \otimes (U^{16} \bigcirc R^{16})$$

$$J2=R^{16} \otimes (U \bigcirc R)$$

$$J3=R \otimes (U^{16} \bigcirc R^{16})$$

$$J4=R \otimes R^{16}$$

$$J0=J1 \bigcirc J2 \bigcirc J3 \bigcirc J4 \bigcirc c_r$$

or a computing circuit group configured to perform a computation equivalent to this computation, wherein the J0 is input as the $U^{17} \bigcirc c_r$ to the 4-bit-to-4-bit transformation table circuit, and the $U^{16} \bigcirc R^{16}$ and the $R^{16}$ are input as the $U^{16} \bigcirc R'$ and the R' to the maskedU$^{-17} \otimes U^{16}$ calculation circuit.

An eighth embodiment according to the present invention has the following configuration based on the sixth embodiment according to the present invention.

Namely, the maskedU$^{16} \otimes U$ calculation circuit includes a computing circuit group, to which the fixed mask value $g_r$, the input data $U \bigcirc g_r$, and the random mask value R are input, and which is configured to calculate two pieces of data such as $U \bigcirc R = (U \bigcirc g_r) \bigcirc R \bigcirc g_r$ and $^{16} \bigcirc R = (U \bigcirc R)^{16} \bigcirc R \bigcirc R^{16}$, and a computing circuit group configured to perform a computation $$J1=(U \bigcirc R) \otimes (U^{16} \bigcirc R)$$

$$J2=R \otimes ((U \bigcirc R) \bigcirc (U^{16} \bigcirc R) \bigcirc R)$$

$$J0=J1 \bigcirc J2 \bigcirc c_r$$

or a computing circuit group configured to perform a computation equivalent to this computation, wherein the J0 is input as the $U^{17} \bigcirc c_r$ to the 4-bit-to-4-bit transformation table circuit, and the $U^{16} \bigcirc R$ and the R are input as the $U^{16} \bigcirc R'$ and the R' to the maskedU$^{-17} \otimes U^{16}$ calculation circuit.

A ninth embodiment according to the present invention has the following configuration based on the sixth embodiment according to the present invention.

Namely, the maskedU$^{-17} \otimes U^{16}$ calculation circuit includes a computing circuit group, to which $U^{-17} \bigcirc d_r$ is output from the 4-bit-to-4-bit transformation table circuit, the fixed mask values $d_r$ and $f_r$, $U^{16} \bigcirc R'$ is output from the maskedU$^{16} \otimes U$ calculation circuit, R', and a random number S generated within the circuit are input, and which is configured to calculate two pieces of data such as $U^{-17} \bigcirc S \bigcirc d_r = (U^{-17} \bigcirc d_r) \bigcirc S$ and $S \bigcirc d_r$, and a computing circuit group configured to perform a computation $$J1=(U^{-17} \bigcirc S \bigcirc d_r) \otimes (U^{16} \bigcirc R')$$

$$J2=R' \otimes (U^{-17} \bigcirc S \bigcirc d_r)$$

$$J3=(S \bigcirc d_r) \otimes (U^{16} \bigcirc R')$$

$$J4=(S \bigcirc d_r) \otimes R'$$

$$J0=J1 \bigcirc J2 \bigcirc J3 \bigcirc J4 \bigcirc f_r$$

or a computing circuit group configured to perform a computation equivalent to this computation, wherein the J0 is output as the $U^{-1} \bigcirc f_r$.

A tenth embodiment according to the present invention has the following configuration based on the sixth embodiment according to the present invention.

Namely, the maskedU$^{-17} \otimes U^{16}$ calculation circuit includes a computing circuit group, to which $U^{-17} \bigcirc d_r$ is output from the 4-bit-to-4-bit transformation table circuit, the fixed mask values $d_r$ and $f_r$, $U^{16} \bigcirc R'$ is output from the maskedU$^{16} \otimes U$ calculation circuit, R', and higher-order 4 bits $R'_H$ and lower-order 4 bits $R'_L$ of R' are input, and which is configured to calculate five pieces of data such as $U^{16} \bigcirc (d_r \| d_r) \bigcirc R'$, $U^{-17} \bigcirc d_r \bigcirc R'_L$, $d_r \bigcirc R'$, $U^{-17} \bigcirc d_r \bigcirc R'_H$ and $d_r \bigcirc R'_H$ and a computing circuit group configured to perform a computation $$J1=(U^{16} \bigcirc (d_r \| d_r) \bigcirc R') \otimes (U^{-17} \bigcirc d_r \bigcirc R'_H)$$

$$J2=(U^{-17} \bigcirc d_r \bigcirc R'_H) \otimes (d_r \bigcirc R'_H) \bigcirc (d_r \bigcirc R'_H)^2$$

$$J3=((U^{16} \bigcirc (d_r \| d_r) \bigcirc R') \bigcirc (U^{-17} \bigcirc d_r \bigcirc R'_L) \bigcirc (d_r \bigcirc R'_L)) \otimes (d_r \bigcirc R'_L)$$

$$J0=J1 \bigcirc (J2 \| (0000)_2) \bigcirc J3 \bigcirc f_r$$

or a computing circuit group configured to perform a computation equivalent to this computation, wherein the J0 is output as the $U^{-1} \bigcirc f_r$.

An eleventh embodiment according to the present invention has the following configuration based on the sixth embodiment according to the present invention.

Namely, the maskedU$^{-17} \otimes U^{16}$ calculation circuit includes a computing circuit group, to which $U^{-17} \bigcirc d_r$ is output from the 4-bit-to-4-bit transformation table circuit, the fixed mask values $d_r$ and $f_r$, $U^{16} \bigcirc R'$ is output from the maskedU$^{16} \otimes U$ calculation circuit, R', and higher-order 4 bits $R'_H$ and lower-order 4-bits $R'_L$, of R' are input, and which is configured to calculate three pieces of data such as $U^{16}_H \bigcirc R'_L =$ (higher-order 4 bits of $U^{16} \bigcirc R') \bigcirc R'_L \bigcirc R'_H$, $U^{-17} \bigcirc R'_L = (U^{-17} \bigcirc d_r) \bigcirc R'_L \bigcirc d_r$, $U^{16}_L \bigcirc R'_L$=(lower-order 4 bits of $U^{16} \bigcirc R'$) by using $U^{16}_H$ and $U^{16}_L$ respectively as higher-order 4 bits and lower-order 4 bits of an 8-bit value $U^{16}$, and a computing circuit group configured to perform a computation $$J1=(U^{16}_H \bigcirc R'_L) \otimes (U^{-17} \bigcirc R'_L)$$

$$J2=((U^{16}_H \bigcirc R'_L) \bigcirc (U^{-17} \bigcirc R'_L) \bigcirc R'_L) \otimes R'_L$$

$$J3=(U^{16}_L \bigcirc R'_L) \otimes (U^{-17} \bigcirc R'_L)$$

$$J4=((U^{16}_L \bigcirc R'_L) \bigcirc (U^{-17} \bigcirc R'_L) \bigcirc R'_L) \otimes R'_L$$

$$J0=((J1 \bigcirc J2) \| (J3 \bigcirc J4)) \bigcirc f_r$$

or a computing circuit group configured to perform a computation equivalent to this computation, wherein the J0 is input as the $U^{-1} \bigcirc f_r$.

In any of the first, the second, the third, the sixth and the eighth embodiments according to the present invention, the multiplication process using the nonlinear transformation can be executed in a binary field represented by $GF(2^8)$. At this time, the binary field $GF(2^8)$ is represented, for example, with a remainder of a polynomial $x^8+x^4+x^3+x+1$.

Additionally, in any of the first to the eleventh embodiments, the multiplication process using the nonlinear transformation can be executed in a composite field represented by $GF(((2^2)^2)^2)$. At this time, the composite field $GF(((2^2)^2)^2)$ is represented, for example, with a remainder of polynomials $GF((2^4)^2=x^2+x+(1100)_2$, $GF((2^2)^2)=x^2+x+(10)_2$ and $GF(2^2)=x^2+x+1$.)

The present invention can be implemented also as an embedded apparatus into which the encryption apparatus according to any one of the first to the eleventh embodiments.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed

BRIEF DESCRIPTION OF DRAWINGS

FIG. 1 illustrates a normal configuration of a common key encryption process;

FIG. 2 illustrates a configuration of a normally known AES encryption algorithm;

FIG. 5 illustrates a normally known AES MixColumn process;

FIG. 7 illustrates a normal expanded key XOR process in common key encryption without DPA countermeasures;

FIG. 8 illustrates a normal linear transformation process in common key encryption without DPA countermeasures;

FIG. 9 illustrates a normal nonlinear transformation process in common key encryption without DPA countermeasures;

FIG. 13A illustrates an example where a differential power curve is created and a spike appears;

FIG. 14 illustrates a configuration implemented by combining FIGS. 7, 8 and 9;

FIG. 16 illustrates a first configuration of an encryption circuit that can be attacked with zero multiplication SPA;

FIG. 17 illustrates a second configuration of an encryption circuit that can be attacked with zero multiplication SPA;

FIG. 22 illustrates a normal inverse element calculation circuit using a table;

FIG. 24 illustrates an inverse element calculation circuit implemented with a simple combination of the conventional examples 2 and 3;

FIG. 25 illustrates a condition, related to input data to a multiplier, for implementing a process safe from the zero multiplication SPA, and also illustrates an observation point for deriving a basic idea of the present invention;

FIG. 26 illustrates a multiplication circuit according to the basic idea of the present invention;

FIG. 27 illustrates a first configuration of the multiplication circuit according to the present invention (basic principle-1);

FIG. 31 illustrates a framework of an inverse element calculation process using a technique of the present invention;

FIG. 32 illustrates a first embodiment using the basic principle-1 for a masked $U^{16} \times U$ calculation;

DESCRIPTION OF EMBODIMENTS

Embodiment is described in detail below with reference to the drawings.

Basic Principle of the Present Invention

The present invention implements an AES encryption processing apparatus that solves all the problems 1 to 3 pointed out in the background art. To solve the problems, the apparatus executes processes that satisfy the following (condition-1), (condition-2), (condition-3) and (condition-4).

(condition-1) The processes of the conventional example 2 except for the AES Subbyte process are executed.

(condition-2) As the AES Subbyte process, an inverse element operation using a composite field is executed with a method safe from SPA and DPA.

(condition-3) As the table process in the composite field operation of (condition-2), the process of the conventional example 2 is executed.

(condition-4) To a multiplication of the composite field operation of (condition-2), random value masked data is always input.

By introducing (condition-1), the problems 1, 2 and 3 are simultaneously solved other than the AES Subbyte process. Since the problem 1 that is the single problem of the conventional example 2 is a problem related only to the Subbyte circuit, all the problems are solved if the conventional example 2 is not used in the Subbyte process. If the problems 1, 2 and 3 can be solved for the AES Subbyte process, it means that all the problems can be solved for the entire AES process.

By introducing (condition-2), the problem 1 is solved for the AES Subbyte process. By replacing an inverse element operation that needs a large circuit scale in the Subbyte process with the process using the composite field of the conventional example 3 illustrated in FIG. 23, the circuit scale is reduced. However, if the operation using the composite field of the conventional example 3 is used unchanged, the process is not safe from SPA and DPA. Therefore, the problem remains unsolved. Moreover, also if SPA and DPA countermeasures are taken, the problem 2 needs to be cleared.

Figure 3:
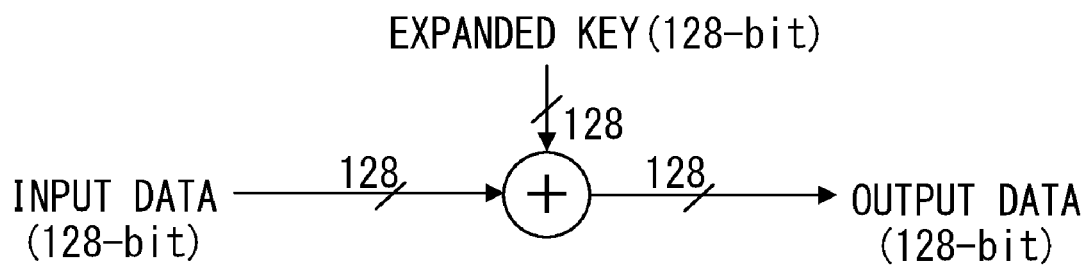
FIG. 3 illustrates a normally known AES RoundKey process.
Figure 4:
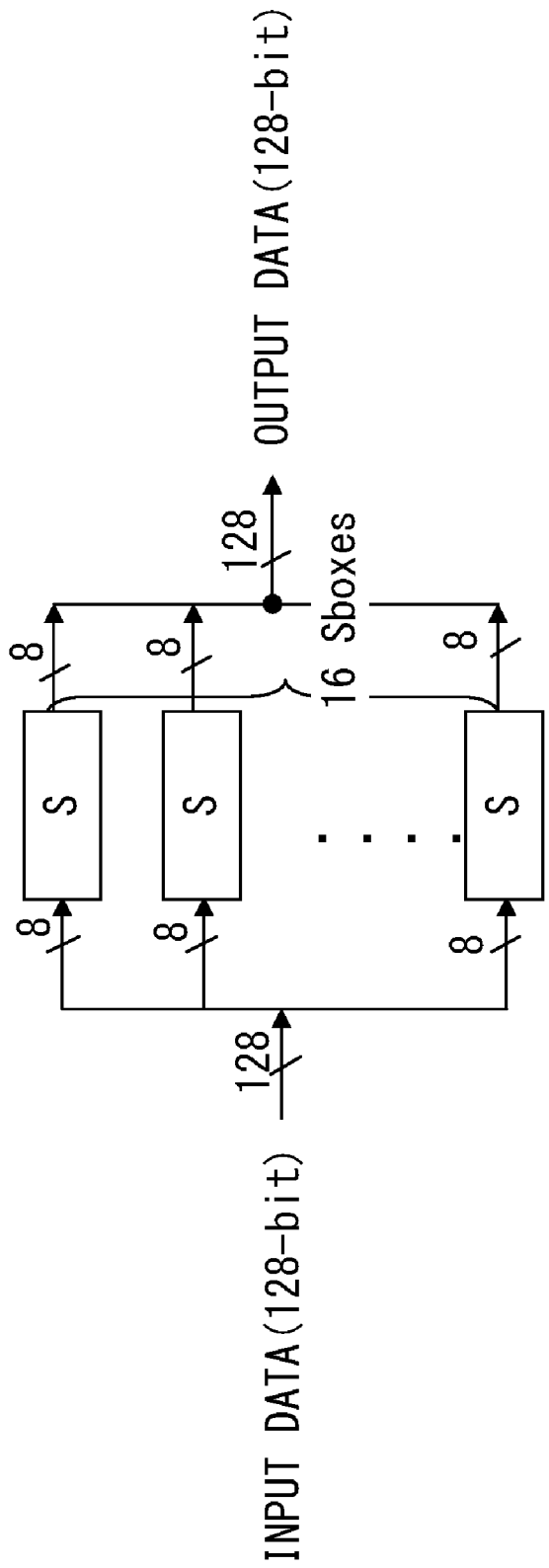
FIG. 4 illustrates a normally known AES Subbyte process.
Figure 6:
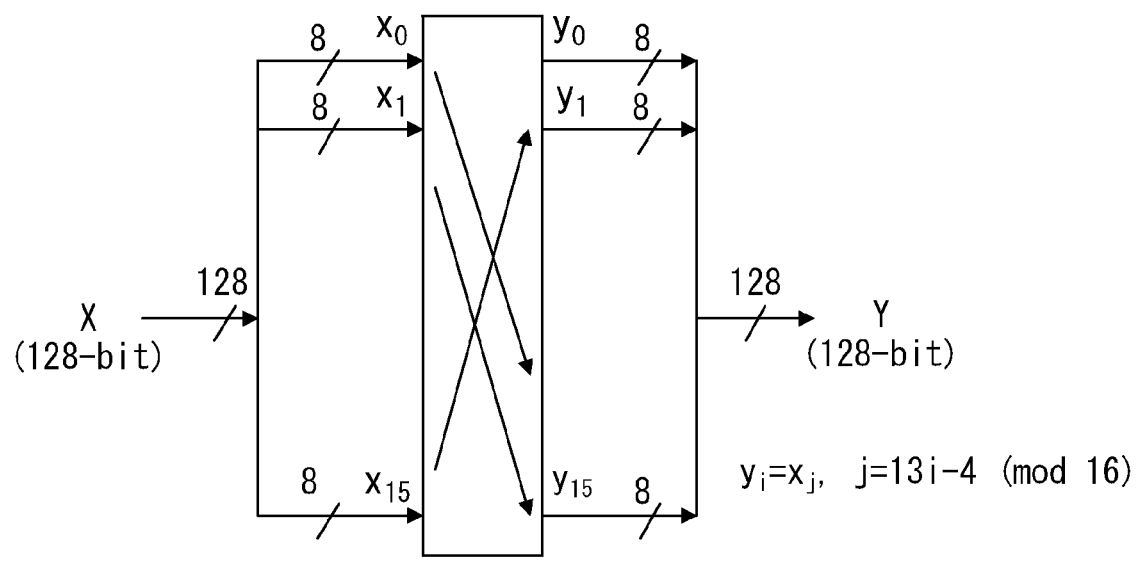
FIG. 6 illustrates a normally known AES ShiftRow process.
Figure 10:
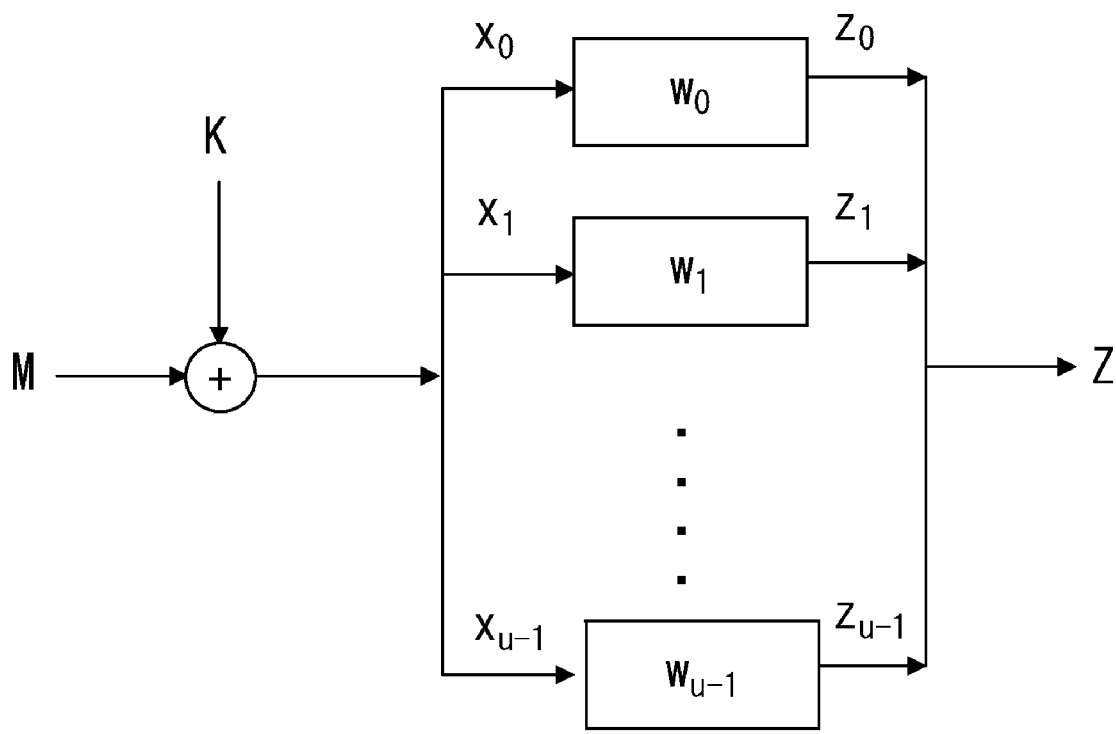
FIG. 10 illustrates a process implemented by combining FIGS. 7 and 9.
Figure 11:
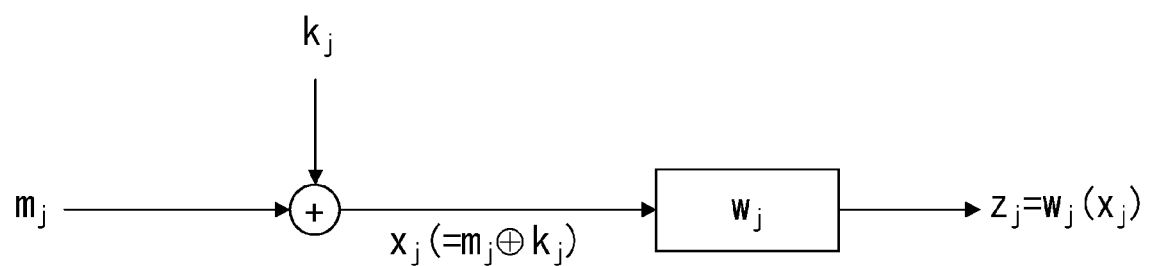
FIG. 11 illustrates a configuration implemented by extracting a bit related to an input/output of w from in the process of FIG. 10.
Figure 12:
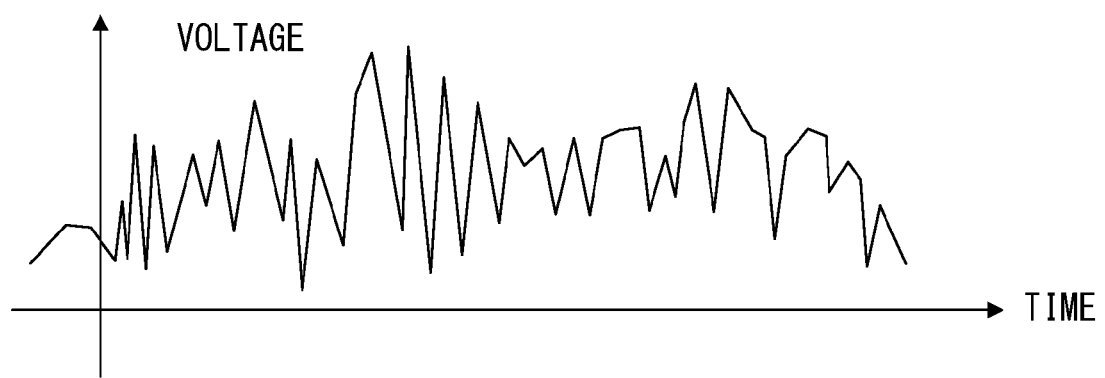
FIG. 12 illustrates an example of power consumption of a smart card.
Figure 13B:
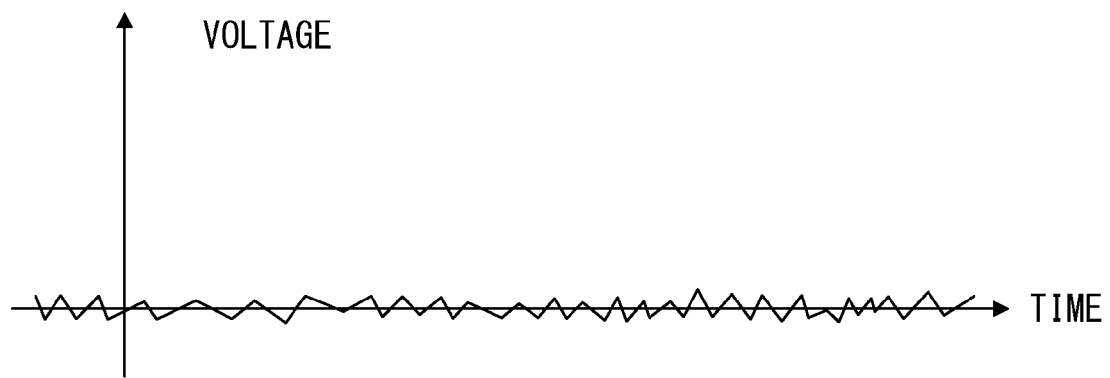
FIG. 13B illustrates an example where a differential power curve is created and a spike does not appear.
Figure 15:
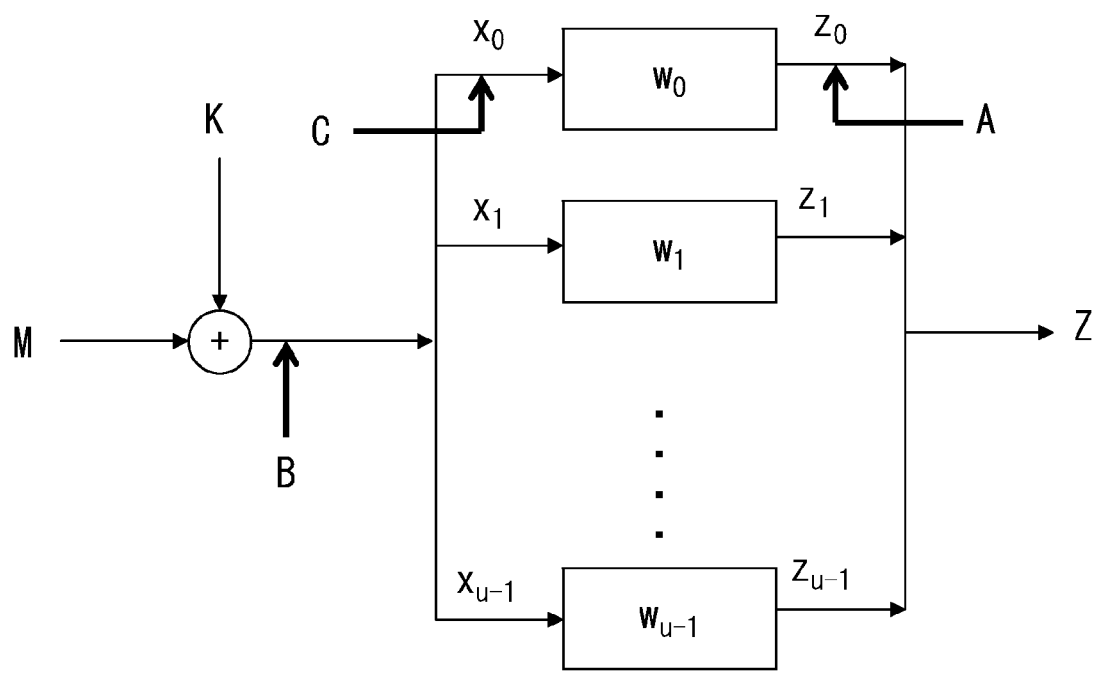
FIG. 15 illustrates a condition, related to a power consumption measurement point, for cryptanalyzing a secret key with DPA.
Figure 18:
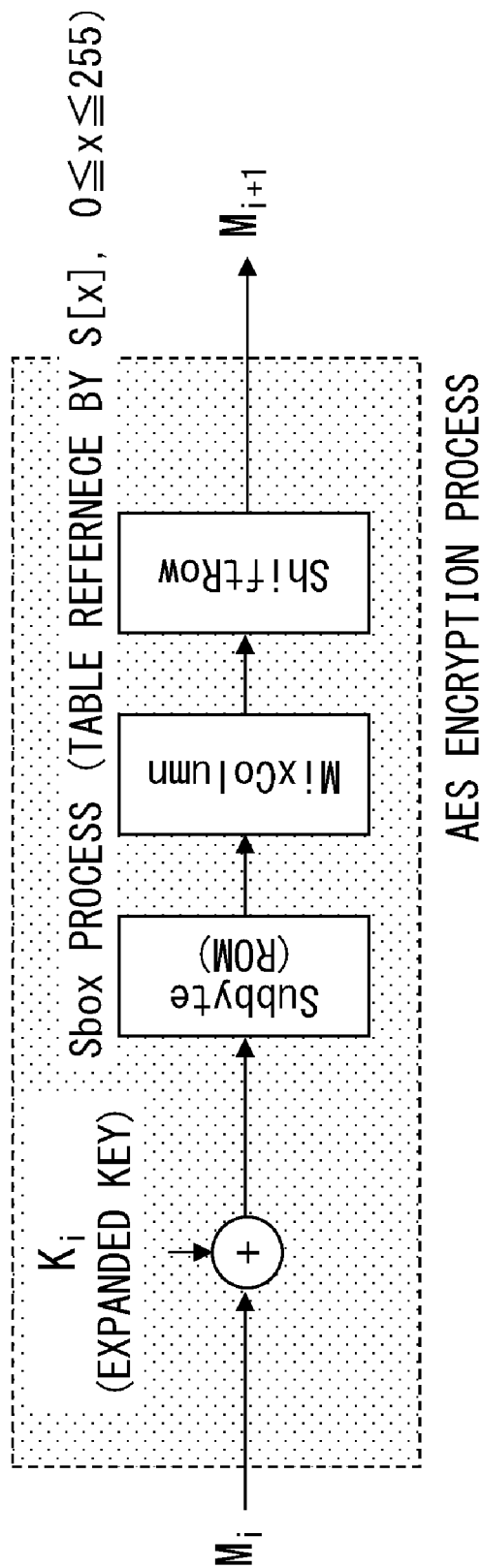
FIG. 18 illustrates a normal AES circuit without DPA countermeasures.
Figure 19:
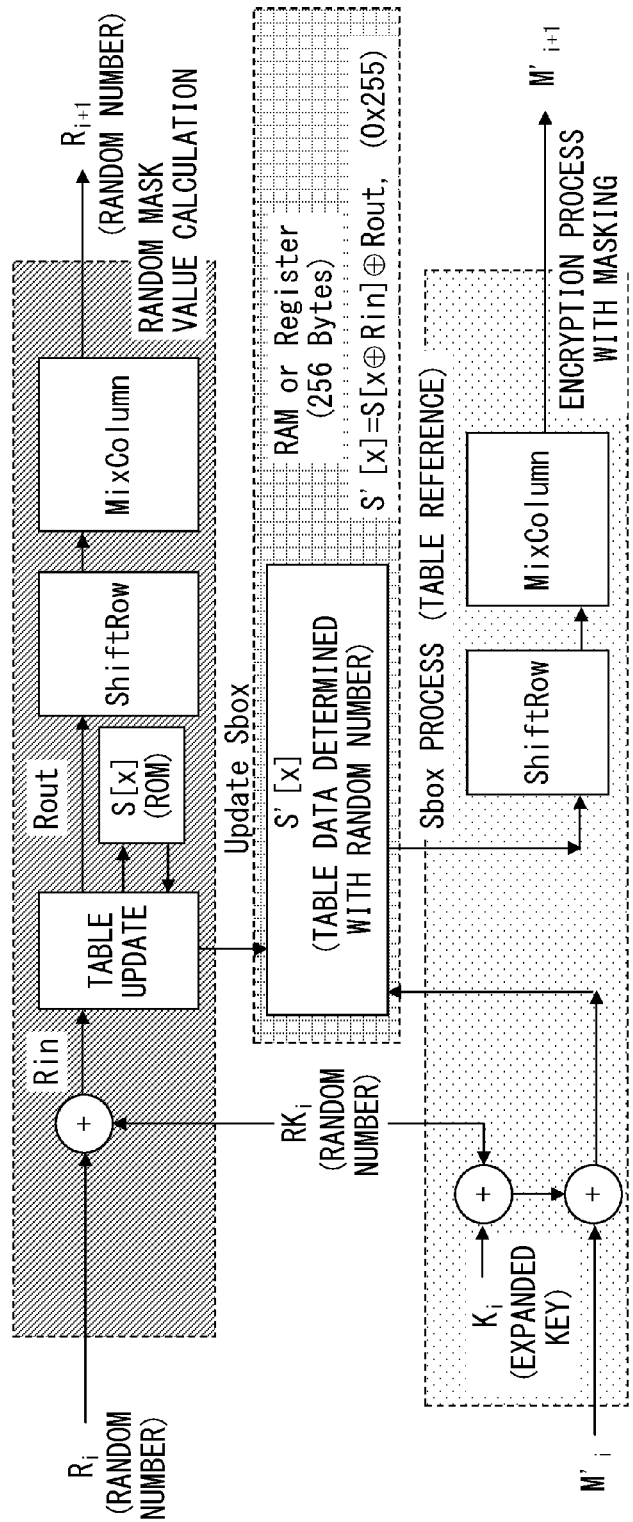
FIG. 19 illustrates a circuit implemented by applying DPA countermeasures of a conventional example 1 to the AES circuit without DPA countermeasures of FIG. 18.
Figure 20:
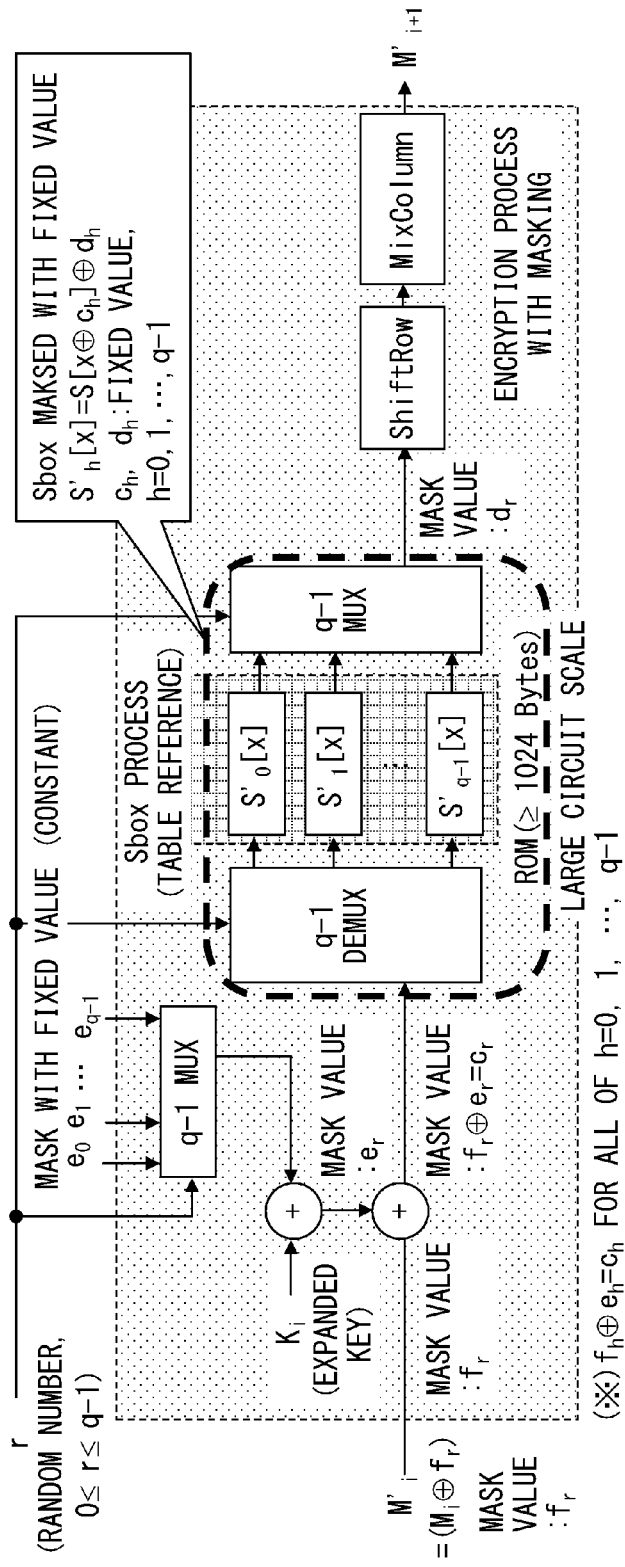
FIG. 20 illustrates a circuit implemented by applying DPA countermeasures of a conventional example 2 to the AES circuit without DPA countermeasures of FIG. 18.
Figure 21:
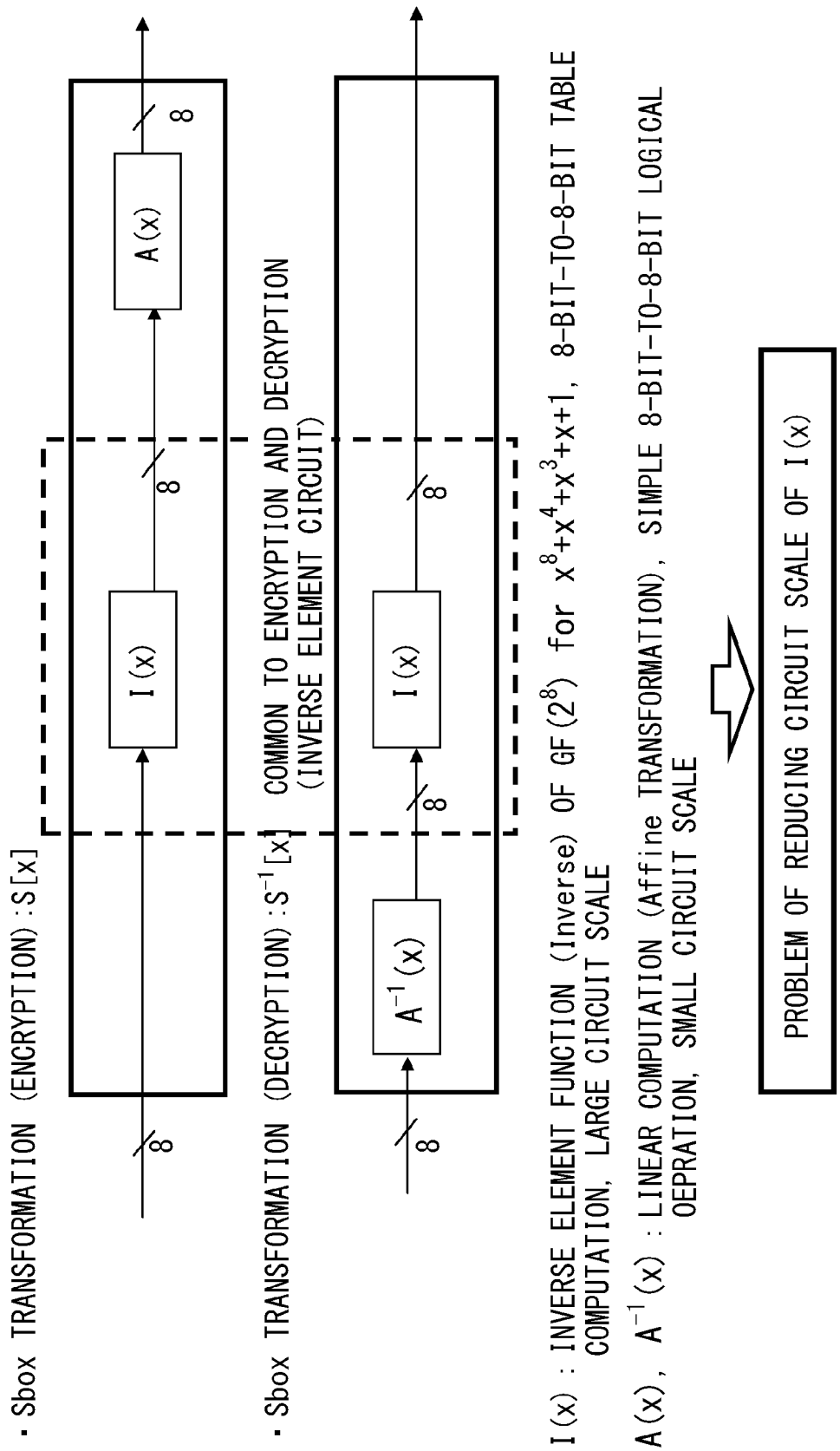
FIG. 21 illustrates a configuration of a normal AES Sbox circuit.
Figure 23:
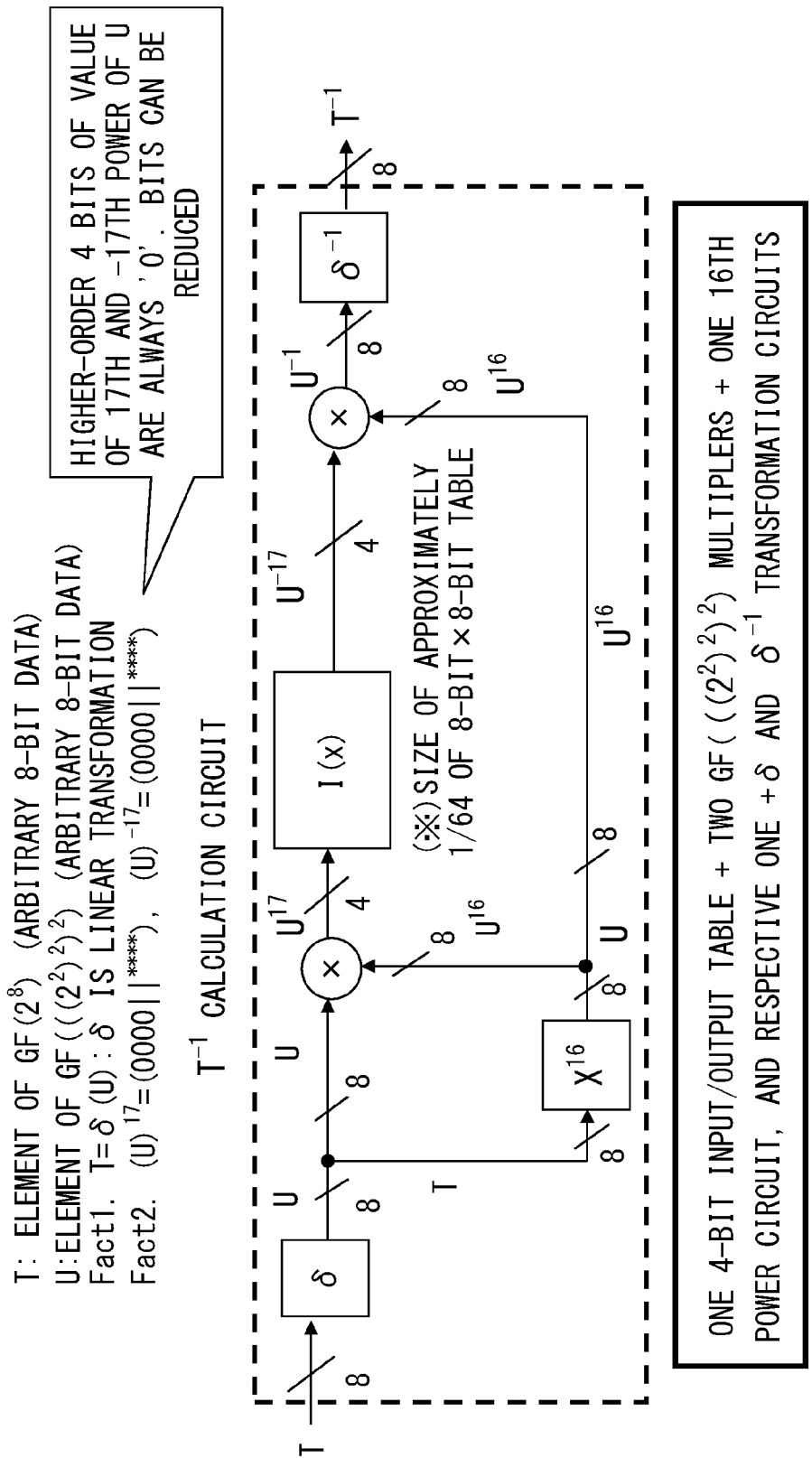
FIG. 23 illustrates an inverse element calculation circuit, referred to in a conventional example 3, using a composite field.

(condition-3) performs the table operation of the conventional example 2 for the table operation in the inverse element operations using the composite field illustrated in FIG. 23. Namely, a method for preparing q tables calculated in advance and for selecting one of the tables with a random number is used. Since the q tables calculated in advance are needed, the problem referred to in the problem 1 can possibly occur. However, the operation is not the inverse element operation using an 8-bit input/output table but a 4-bit input/output table operation using a composite field. Therefore, the circuit scale of each table can be reduced to ¹⁄₆₄ of the 8-bit input/output table, and the problem 1 does not occur. Accordingly, all the problems 1, 2 and 3 can be solved for the table operation in FIG. 23. If this table operation process is executed with the method of the conventional example 1, the table needs to be updated according to a random number. To update the 4-bit table, 16 cycles are needed. Since the table operation is normally executed in one cycle, penalty caused by this table update significantly slows down the processing speed, and the problem 2 occurs.

(condition-4) is a policy of SPA and DPA countermeasures for a multiplication among the inverse element operations using the composite field illustrated in FIG. 23. As described above in (ZSPA-sec), using random value masked data as all pieces of data input to the multiplication process functions as SPA countermeasures against the zero multiplication SPA. Moreover, by using random value masked data, also DPA countermeasures for the multiplication can be simultaneously taken. Accordingly, the problem 3 is solved. Additionally, this multiplication process can be executed in one cycle, and penalty of the processing speed as in the process for updating a table in accordance with a random number is not caused. Therefore, the problem 2 is solved.

According to the present invention, the AES process that satisfies all the above described (condition-1) to (condition-4) is executed. The basic policy of satisfying all these conditions is to execute a masking process using a random mask value only for a multiplication process in an inverse element operation using a composite field, and to execute a masking process using a fixed mask value for other processes. A basic idea for realizing this policy is described below.

<Basic Idea of Solving the Problems>

FIG. 26 illustrates the basic idea of the present invention for executing the process using random value masked data only for a multiplication process and the process using fixed value masked data for other processes.

In the conventional examples, either or both of inputs to a multiplier are fixed value masked data as illustrated in an upper portion of FIG. 26. In the meantime, according to the present invention, fixed value masked data is transformed into random value masked data by XORing the fixed value masked data with a random mask value as illustrated in a lower portion of FIG. 26. Namely, data $X \bigcirc p_r$ masked with the fixed mask value $p_r$ is fixed value masked data. By XORing this data with a random number R, $X \bigcirc R \bigcirc p_r$ is obtained. If R is a random value that can take an arbitrary 8-bit value, also R' represented by $R'=R \bigcirc p_r$ is a random value that can take an arbitrary 8-bit value. Therefore, $X \bigcirc R \bigcirc p_r = X \bigcirc R'$ results in random value masked data.

By XORing also data $Y \bigcirc q_r$ masked with a fixed mask value $q_r$ with the random number S, $Y \bigcirc S \bigcirc q_r = Y \bigcirc S'$ results in random value masked data. A multiplication of $(X \bigcirc R') \otimes (Y \bigcirc S')$ is performed for these pieces of random value masked data, namely, the two inputs to the multiplier are random value masked data. Therefore, with the method according to the present invention, a process safe from SPA and DPA is implemented. However, also data output as a result of this multiplication is random value masked data. As indicated by (condition-1), according to the present invention, the processes of the conventional example 2, namely, the processes using fixed value masked data need to be executed other than the Subbyte process. Accordingly, random value masked data that is output as a result of multiplying pieces of random value masked data needs to be transformed into fixed value masked data. This process is executed by the random mask value-to-fixed mask value transformation processing circuit illustrated in FIG. 26.

FIG. 26 illustrates the idea of the multiplication process according to the present invention in an abstract manner. Various methods are considered as a specific operation method. In an inverse element operation process using a composite field, two types of multiplications such as $U^{17}=U^{16} \otimes U$ and $U^{-1}=U^{-17} \otimes U^{16}$ are performed. Depending on which of the two types of multiplications is performed as the multiplication process according to the present invention, a way of giving R and S, and a calculation method of the random mask value-to-fixed mask value transformation process differ. A multiplication method according to the present invention applicable to either or both of the two types of multiplications is represented by the following (basic principle-1), (basic principle-2), (basic principle-3) and (basic principle-4). Table 2 represents correspondences of the types ($U^{17}=U^{16} \otimes U$ and $U^{-1}=U^{-17} \otimes U^{16}$) of multiplications to which techniques according to (basic principle-1), (basic principle-2), (basic principle-3) and (basic principle-4) are applicable.

In the following description of (basic principle-1) to (basic principle-4), data calculated in a normal AES process without PA countermeasures, random mask values, and a fixed mask value are respectively referred to as X and Y, R and S, and $f_r$. Random mask values obtained by XORing the fixed mask values with a random number as represented by $R'=R\bigcirc p_r$ and $S'=S\bigcirc q_r$ are denoted as R' and S'.

[Basic Principle-1]

This is a method applicable to both of multiplications such as $U^{17}=U^{16}\otimes U$ and $U^{-1}=U^{-17}\otimes U^{16}$ (FIG. 27).

$$J1=(X\bigcirc R')\otimes(Y\bigcirc S')$$

$$J2=S'\otimes(X\bigcirc R')$$

$$J3=R'\otimes(Y\bigcirc S')$$

$$J4=R'\otimes S'$$

If $U^{17}=U^{16}\otimes U$, X, Y, R' and S' are 8 bits. If $U^{-1}=U^{-17}\otimes U^{16}$, X and R' are 8 bits, and Y and S' are 4 bits.

J1, J2, J3 and J4 are calculated, and $J0=X\otimes Y\bigcirc f_r$ is obtained from $J0=J1\bigcirc J2\bigcirc J3\bigcirc J4\bigcirc f_r$. A circuit for calculating $X\otimes Y\bigcirc f_r$ according to the basic principle-1 is represented with MaskedMul__1(X$\bigcirc$R', Y$\bigcirc$S', R', S', $f_r$) as a symbol. Moreover, if (law-1) to (law-3) are taken into account, $$J1=X\otimes Y\oplus X\otimes S'\bigcirc Y\otimes R'\bigcirc R'\otimes S'$$

$$J2=S'\otimes X\bigcirc S'\otimes R'$$

$$J3=R'\otimes Y\bigcirc R'\otimes S'$$

$$J4=R'\otimes S'$$

Therefore, $J0=J1\bigcirc J2\bigcirc J3\bigcirc J4\bigcirc f_r=X\otimes Y\bigcirc f_r$ can be verified.

All pieces of data input to the multiplication processes J1 to J4 are random value masked data. Therefore, the process safe from SPA and DPA can be implemented. The number of multiplications needed for this process is as follows.

For $U^{17}=U^{16}\otimes U$, four 8-bit×8-bit multiplications

For $U^{-1}=U^{-17}\otimes U^{16}$, four 8-bit×4-bit multiplications (or eight 4-bit×4-bit multiplications)

The basic principle-1 is based on (law-1) to (law-3). Therefore, this principle is applicable to an operation of an arbitrary binary field and composite field.

[Basic Principle-2]

If the PA countermeasures according to the basic principle-1 is used, one multiplication without PA countermeasures is replaced with four multiplications. An increase in the number of multiplications results in an overhead associated with the PA countermeasures. Accordingly, by reducing the number of multiplications after this replacement, the overhead associated with the PA countermeasures is decreased. Specializing S' in the basic principle-1 with S'=R' (basic principle-2) in order to decrease the overhead is (basic principle-2). With this specialization, the operation process is simplified. Therefore, one multiplication without PA countermeasures is replaced with two multiplications.

Figure 28:
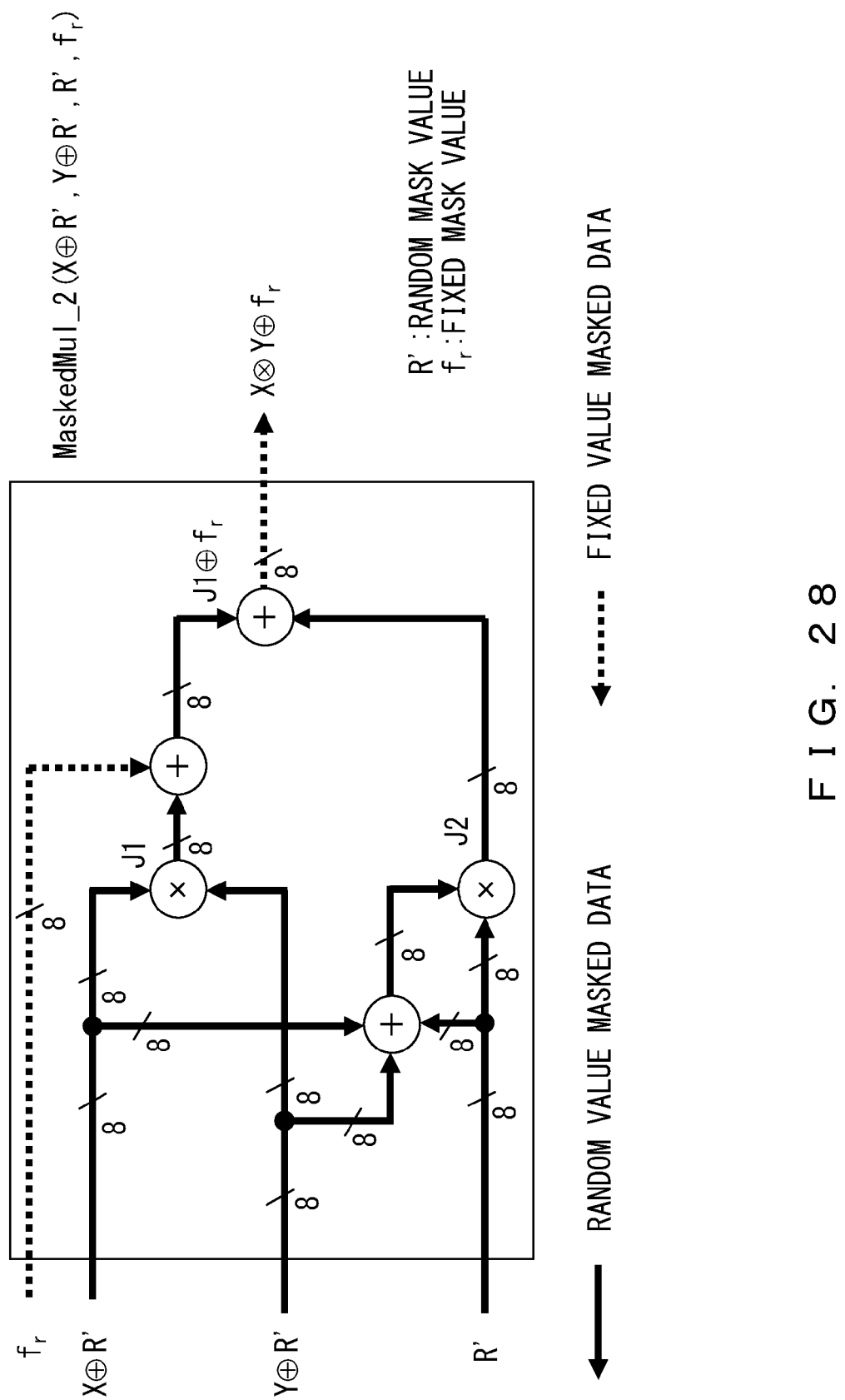
FIG. 28 illustrates a second configuration of the multiplication circuit according to the present invention (basic principle-2)

However, the specialization using S'=R' can be performed only if the data bit lengths of S' and R' are equal. Accordingly, (basic principle-2) is applicable only if the bit lengths of two pieces of input data of the multiplication without PA countermeasures are equal. Namely, this is a method applicable only to an 8-bit×8-bit multiplication represented by $U^{17}=U^{16}\otimes U$ (FIG. 28), and is not applicable to an 8-bit×4-bit multiplication represented by $U^{-1}=U^{-17}\otimes U^{16}$.

$$J1=(X\bigcirc R')\otimes(Y\bigcirc R')$$

$$J2=R'\otimes((X\bigcirc R')\bigcirc(Y\bigcirc R')\bigcirc R')$$

where X, Y and R' are 8 bits. J1 and J2 are calculated, and $J0=X\otimes Y\bigcirc f_r$ is obtained from $J0=J1\bigcirc J2\bigcirc f_r$. A circuit for calculating $X\otimes Y\bigcirc f_r$ in accordance with the basic principle-2 is represented with MaskedMul__2(X$\bigcirc$R', Y$\bigcirc$R', R', $f_r$) as a symbol. Moreover, if (law-1) to (law-3) are taken into account, $$J1=X\otimes Y\bigcirc X\otimes R'\bigcirc Y\otimes R'\bigcirc R'^2$$

$$J2=X\otimes R'\bigcirc Y'\otimes R'\bigcirc R'^2$$

Therefore, $J0=J1\bigcirc J2\bigcirc f_r=X\otimes Y\bigcirc f_r$ can be verified.

All pieces of data input to the multiplication processes of J1 and J2 are random value masked data. Therefore, the process safe from SPA and DPA can be implemented. The number of multiplications needed for this process is as follows.

For $U^{17}=U^{16}\otimes U$, two 8-bit×8-bit multiplications

Since the basic principle-2 is based on (law-1) to (law-3), this principle is applicable to an operation of an arbitrary binary field and composite field.

[Basic Principle-3]

By using the basic principle-2, an overhead of the number of multiplications performed for the PA countermeasures can be decreased according to the present invention. However, a multiplication to which this technique is applicable is only an 8-bit×8-bit multiplication represented by $U^{17}=U^{16}\otimes U$, and is not applicable to an 8-bit×4-bit multiplication represented by $U^{-1}=U^{-17}\otimes U^{16}$. A method, applicable to an 8-bit×4-bit multiplication represented by $U^{-1}=U^{-17}\otimes U^{16}$, for reducing the overhead of the number of multiplications in accordance with the basic principle-1 in order to improve this problem is the following basic principle-3.

Figure 29:
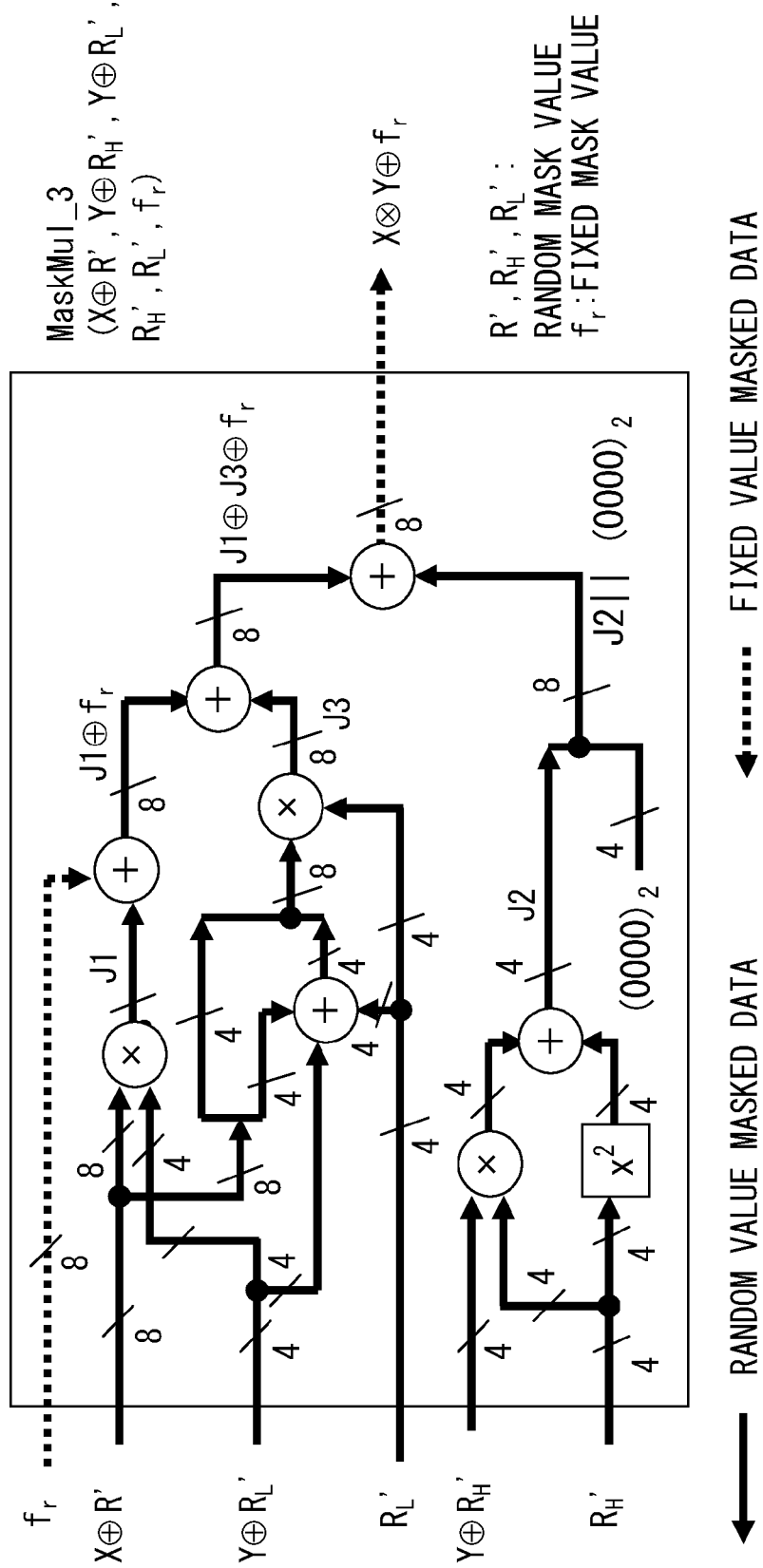
FIG. 29 illustrates a third configuration of the multiplication circuit according to the present invention (basic principle-3)

A basic idea of the basic principle-2 is to simplify the calculation by making the random mask value R' of X and the random mask value S' of Y common with S'=R'. This idea is possible only if the bit lengths of X and Y are equal. If the bit lengths are different, S'=R' is impossible. Accordingly, it is impossible to make two random mask values equal if bits lengths are different. However, it is possible to make these mask values partially equal. Namely, if R' and S' are assumed to be 8 bits and 4 bits respectively, random mask values can be made partially equal by setting $S'=R'_L$ when R' is separated into higher-order 4 bits value $R'_H$ and lower-order 4 bits value $R'_L$ as represented by $R'=R'_H\|R'_L$. A method, applicable to the 8-bit×4-bit multiplication represented by $U^{-1}=U^{-17}\otimes U^{16}$, for reducing the overhead of the number of multiplications in accordance with the basic principle-1 by adopting the above described idea is described below (FIG. 29).

$$J1=(X\bigcirc R')\otimes(Y\bigcirc R'_L)$$

$$J2=(Y\bigcirc R'_H)\otimes R'_H\bigcirc R'_H{}^2$$

$$J3=((X\bigcirc R')\bigcirc(Y\bigcirc R'_L)\bigcirc R'_L)\otimes R'_L$$

where X and R' are 8 bits, Y, $R'_H$ and $R'_L$ are 4 bits, and $R'=R'_H\|R'_L$. J1, J2 and J3 are calculated, and $J0=X\otimes Y\bigcirc f_r$ is obtained from $J0=J1\bigcirc(J2\|(0000)_2)\bigcirc J3\bigcirc f_r$. A circuit for calculating $X\otimes Y\bigcirc f_r$ in accordance with the basic principle-3 is represented with MaskedMul__3(X$\bigcirc$R', Y$\bigcirc$$R'_H$, Y$\bigcirc$$R'_L$, $R'_H$, $R'_L$, $f_r$) as a symbol. Moreover, if (law-1) to (law-4) are taken into account, $$J1=(X_H\bigcirc R'_H)\otimes(Y\bigcirc R'_L)\|(X_L\bigcirc R'_L)\otimes(Y\bigcirc R'_L)=\\(X_H\otimes Y\bigcirc X_H\otimes R'_L\bigcirc Y\otimes R'_H\bigcirc R'_H\otimes R'_L)\|\\(X_L\otimes Y\bigcirc X_L\otimes R'_L\bigcirc Y\otimes R'_L\bigcirc R'_L{}^2)$$

$$J2\|(0000)_2=(Y\otimes R'_H)\|(0000)_2$$

$$J3=(X_H\bigcirc R'_H)\otimes R'_L\|(X_L\bigcirc R'_L\bigcirc Y\bigcirc R'_L)\otimes R'_L=\\(X_H\otimes R'_L\bigcirc R'_H\otimes R'_L)\|(X_L\otimes R'_L\bigcirc Y_L\bigcirc R'_L\bigcirc R'_L{}^2)$$

where $X_H$ and $X_L$ are 4-bit values that satisfy $X=X_H \| X_L$. Accordingly, $J0=J1 \bigcirc (J2 \ (0000)_2) \bigcirc J3 \bigcirc f_r = ((X_H \otimes Y)(X_L \otimes Y)) \bigcirc f_r$ is obtained. If $X \otimes Y = ((X_H \otimes Y)(X_L \otimes Y))$ is taken into account in accordance with (law-4), $J0=J1 \bigcirc (J2\|(0000)_2) \bigcirc J3 \bigcirc f_r = X \otimes Y \bigcirc f_r$ can be derived.

All pieces of data input to the multiplication processes of J1, J2 and J3 are random value masked data. Therefore, the process safe from SPA and DPA can be implemented. The number of multiplications needed for this process is as follows.

For $U^{17}=U^{16} \otimes U$, two 8-bit×4-bit multiplications, one 4-bit×4-bit multiplication, and one 4-bit×4-bit square operation Furthermore, if it is taken into account that one 8-bit×4-bit multiplication corresponds to two 4-bit×4-bit multiplications and one 4-bit×4-bit square operation costs less than one 4-bit×4-bit multiplication (namely, costs less than one 4-bit×4-bit multiplication), the number of multiplications needed for the basic principle-3 can be also represented as follows.

For $U^{17}=U^{16} \otimes U$, $\phi$ 8-bit×4-bit multiplications ($2.5<\phi<3$)

Since the basic principle-3 is based on (law-1) to (law-4), this principle is applicable to an operation of the composite field $F((\ldots(2^{\beta 1})\ldots)^{\beta\gamma})$ that satisfies $\beta\gamma=2$.

[Basic Principle-4]

Figure 30:
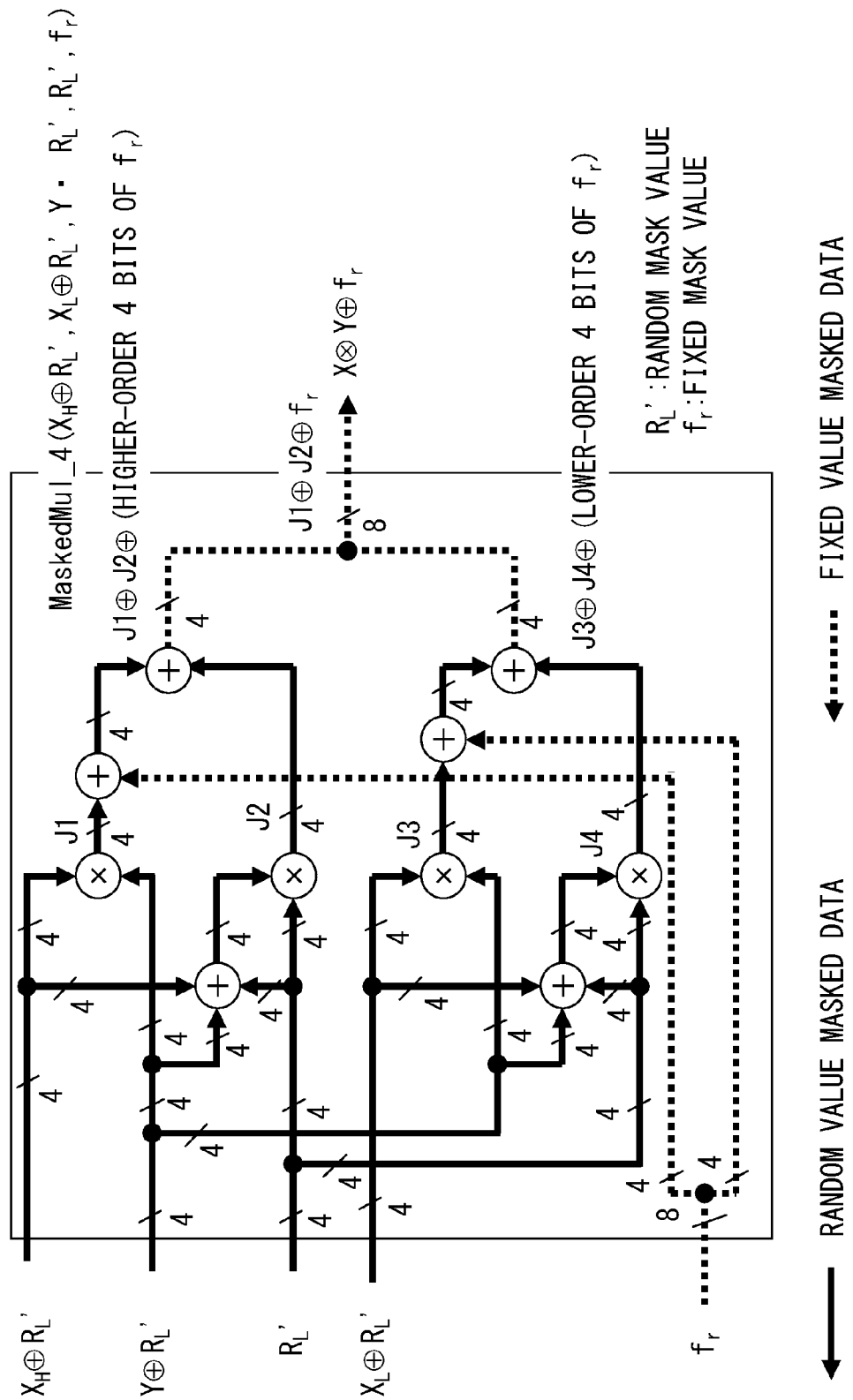
FIG. 30 illustrates a fourth configuration of the multiplication circuit according to the present invention (basic principle-4)

For an 8-bit×4-bit multiplication represented by $U^{-1}=U^{-17} \otimes U^{16}$, four 8-bit×4-bit multiplications are needed according to the basic principle-1. In the meantime, the number of multiplications can be reduced to $\phi$ 8-bit×4-bit multiplications ($2.5<\phi<3$) according to the basic principle-3. A method for further reducing the number of multiplications by using the nature of an 8-bit×4-bit multiplication is the basic principle-4. By using (law-4), an 8-bit×4-bit multiplication can be separated into two 4-bit×4-bit multiplications. According to the basic principle-4, two pieces of data input to each of the 4-bit×4-bit multiplications are XORed with the same random number likewise (basic principle-2) (FIG. 30).

$$J1=(X_H \bigcirc R'_L) \otimes (Y \bigcirc R'_L)$$

$$J2=((X_H \bigcirc R'_L) \bigcirc (Y \bigcirc R'_L) \bigcirc R'_L) \otimes R'_L$$

$$J3=(X_L \bigcirc R'_L) \otimes (Y \bigcirc R'_L)$$

$$J4=((X_L \bigcirc R'_L) \bigcirc (Y \bigcirc R'_L) \bigcirc R'_L) \otimes R'_L$$

where X is 8 bits, $X_H$, $X_L$, Y and $R'_L$ are 4 bits, and $X=X_H\|X_L$. J1, J2, J3 and J4 are calculated, and $J0=X \otimes Y \bigcirc f_r$ is obtained from $J0=((J1 \bigcirc J2) \ (J3 \bigcirc J4)) \bigcirc f_r$. If (law-1) to (law-4) are taken into account, $$J1 \bigcirc J2 = (X_H \bigcirc R'_L) \otimes (Y \bigcirc R'_L) \bigcirc$$
$$(X_H \bigcirc R'_L \bigcirc Y \bigcirc R'_L \bigcirc R'_L) \otimes R'_L =$$
$$X_H \otimes Y X_H \otimes R'_L \bigcirc Y \otimes R'_L \bigcirc R'^2_L \bigcirc X_H \otimes R'_L \bigcirc Y \otimes R'_L \bigcirc R'^2_L =$$
$$X_H \otimes Y$$

$$J3 \bigcirc J4 = (X_L \bigcirc R'_L) \otimes (Y \bigcirc R'_L) \bigcirc$$
$$(X_L \bigcirc R'_L \bigcirc Y \bigcirc R'_L \bigcirc R'_L) \otimes R'_L =$$
$$X_L \otimes Y X_L \otimes R'_L \bigcirc Y \otimes R'_L \bigcirc R'^2_L \bigcirc X_L \otimes R'_L \bigcirc Y \otimes R'_L \bigcirc R'^2_L =$$
$$X_L \otimes Y$$

A circuit for calculating $X \otimes Y \bigcirc f_r$ in accordance with the basic principle-4 is represented with MaskedMul_4 ($X_H \bigcirc R'_L$, $X_L \bigcirc R'_L$, $Y \bigcirc R'_L$, $R'_L$, $f_r$) as a symbol. Since $X \otimes Y = ((X_H \otimes Y)\|(X_L \otimes Y))$ according to (law-4), $J0 = ((J1 \bigcirc J2)\|(J3 \bigcirc J4)) \bigcirc f_r = X \otimes Y \bigcirc f_r$ can be verified.

Since all pieces of data input to the multiplication processes of J1, J2, J3 and J4 are random value masked data, the process safe from SPA and DPA can be implemented. The number of multiplications needed for this process is as follows.

For $U^{17}=U^{16} \otimes U$, four 4-bit×4-bit multiplications (equivalent to two 8-bit×4-bit multiplications)

The basic principle-4 is based on (law-1) to (law-4). Therefore, this principle is applicable to an operation of the composite field $GF((\ldots(2^{\beta 1})\ldots)^{\beta\gamma})$ that satisfies $\beta\gamma=2$.

Configurations of Embodiments According to the Present Invention

Embodiments implemented by applying the techniques of the present invention referred to in the basic principle-1, the basic principle-2, the basic principle-3 and the basic principle-4 to the inverse element operation of the conventional example 3 illustrated in FIG. 23 are described below. The embodiments implemented when the present invention is applied to a core portion of the process of the inverse element operation, namely, the calculation portion of the composite field as illustrated in FIG. 31 are described below. With the inverse element operation referred to in the embodiments according to the present invention, the following steps i to iv are executed in common.

i. The inverse element operation circuit is a circuit for calculating and outputting an element $T^{-1} \bigcirc q_r$ of $GF(2^8)$ with an input of an element $T \bigcirc p_r$ of $GF(2^8)$. Note that $p_r$ and $q_r$ are fixed mask values selected with a random number r.

ii. Calculating $\delta(T \bigcirc p_r) = \delta(T) \bigcirc \delta(p_r) = U \bigcirc g_r$ by performing a $\delta$ transformation for the element $T \bigcirc g_r$ of the input $GF(2^8)$. Note that $g_r$ is a fixed mask value selected with the random number r, and satisfies $g_r = \delta(p_r)$.

iii. Calculating $U^{-1} \bigcirc f_r$ from $U \bigcirc g_r$ by performing an operation implemented by combining a multiplication and a table operation for $U \bigcirc g_r$. $f_r$ represents a fixed mask value selected with the random number r.

iv. Calculating $\delta^{-1}(U^{-1} \bigcirc f_r) = \delta^{-1}(f_r) = T^{-1} \bigcirc q_r$ by performing a $\delta^{-1}$ transformation for $U^{-1} \bigcirc f_r$. A relational expression $\delta^{-1}(f_r) = q_r$ is satisfied between $q_r$ and $f_r$.

Embodiments for implementing SPA and DPA countermeasures by applying the techniques of the present invention referred to in the basic principle-1, the basic principle-2, the basic principle-3 and the basic-principle 4 to the inverse element operation described in iii among the above described i to iv steps are described below.

FIG. 31 illustrates a framework for performing the calculation of iii.

The calculation of FIG. 31 is composed of two multiplication processes such as a "masked $U^{16} \otimes U$ calculation" and a "masked $U^{-17} \otimes U^{16}$ calculation". These processes are implemented as circuits for performing the multiplication processes while performing a data masking process, and respectively have the following functions.

Masked $U^{16} \otimes U$ Calculation

The basic function of this circuit is to calculate and output $U^{17} \bigcirc c_r$ with an input of $U \bigcirc g_r$. Note that $c_r$ and $g_r$ are fixed mask values selected with the random number r, and are 4 bits and 8 bits, respectively. The fixed mask values $c_r$ and $g_r$ are given as inputs to this circuit. To perform a multiplication with data masked with a random value within the circuit, the random number R is given as an input. Moreover, two pieces of data represented with $U' \bigcirc R'$ and $R'$ are output and given as inputs to a masked $U^{-17} \otimes U^{16}$ calculation. The value output as $R'$ varies depending on an embodiment of this circuit. For a first embodiment using the multiplication circuit according to the basic principle-1, $R'=R^{16}$. For a second embodiment using the multiplication circuit according to the basic principle-2, $R'=R$. The first embodiment and the second embodiment will be described in detail later.

Masked $U^{-17} \otimes U^{16}$ Calculation

The basic function of this circuit is to calculate and output $U_{-1} \bigcirc f_r$ with inputs $U^{-17} \bigcirc d_r$ and $U' \bigcirc R'$, and a random number R'. Note that $d_r$ and $f_r$ are fixed mask values selected with the random number r, and are 4 bits and 8 bits, respectively. The fixed mask values $d_r$ and $f_r$ are given as inputs to this circuit.

FIG. 31 illustrates a process for calculating output data $U^{-1} \bigcirc f_r$ from input data $U \bigcirc g_r$. A flow of the whole of this calculation process is described.

A 4-bit value $U^{17} \bigcirc c_r$ is calculated from an 8-bit value $U \bigcirc g_r$ with the $U^{16} \otimes U$ calculation. For $U^{17} \bigcirc c_r$, $U^{-17} \bigcirc d_r$ is calculated with a 4-bit-to-4-bit transformation table $I'_r[x]$ selected with the random number r. If a 4-bit-to-4-bit inverse element transformation table of the element $GF(((2^2)^2)^2)$ is represented as $I[x]=x^{-1}$, this is a table for performing a transformation represented by $I'_h[x]=I[x \bigcirc c_h] \bigcirc d_h$ for all of h=0, 1, ..., q−1. By performing the transformation using $I'_r[x]$ for $U^{17} \bigcirc c_r$, $I' \cdot [U^{17} \bigcirc c_r]=I[U^{17} \bigcirc c_r] \bigcirc c_r] \bigcirc d_r=I[U^{17}] \bigcirc d_r=(U^{17})^{-1} \bigcirc d_r=U^{-17} \bigcirc d_r$ can be calculated. This data is the first input of the two pieces of input data to the masked $U^{-17} \otimes U^{16}$ calculation.

A calculation of $U^{16} \bigcirc R'$ is performed as the second piece of input data to the masked $U^{-17} \otimes U^{16}$ calculation. In the first embodiment to be described later, $U^{16} \bigcirc R'$ results in $R'=R^{16}$ because data of $(U \bigcirc R)^{16} = U^{16} \bigcirc R^{16}$ calculated during the masked $U^{16} \otimes U$ calculation is used. In the second embodiment to be described later, $U^{16} \bigcirc R'$ results in $R'=R$ because the value of $U^{16} \bigcirc R$ calculated during the masked $U^{16} \otimes U$ calculation is used.

The reason that $(U \bigcirc R)^{16} = U^{16} \bigcirc R^{16}$ is satisfied is that a 16th power operation is an operation performed by repeating a square operation by four times, and a result of one square operation once satisfies $(U \bigcirc R)^2 = U^2 \bigcirc 2U \otimes R \bigcirc R^2 = U^2 \bigcirc R^2$, namely, a form of $U^k \bigcirc R^k$ for an integer k if (law-3) is taken into account. Accordingly, $U^{16} \bigcirc R^{16}$ is obtained for the 16th power operation.

As described above, $U^{-1} \bigcirc f_r$ is obtained by giving values resulting from $U^{-17} \bigcirc d_r$ and $U^{16} \bigcirc R'$ as two pieces of input values to the masked $U^{-17} \otimes U^{16}$ calculation after $U^{-17} \bigcirc d_r$ and $U^{16} \bigcirc R'$ are calculated.

By using the circuit described in the basic principle-1, the basic principle-2, the basic principle-3 or the basic principle-4 for the above described masked $U^{16} \otimes U$ calculation and masked $U^{-17} \otimes U^{16}$ calculation, the process safe from SPA and DPA can be realized. Embodiments implemented by applying the basic principle-1, the basic principle-2, the basic principle-3 and the basic-principle 4 to the masked $U^{16} \otimes U$ calculation and the masked $U^{-17} \otimes U^{16}$ calculation are described below.

FIG. 32 illustrates a configuration of the first embodiment according to the present invention for calculating masked $U^{16} \otimes U$ by using the multiplication circuit according to the basic principle-1. Three pieces of data such as $U \bigcirc R = (U \bigcirc g_r) \bigcirc R \bigcirc g_r$, $U^{16} \bigcirc R^{16} = (U \bigcirc R)^{16}$ and $R^{16}$ are calculated from input data $g_r$, $U \bigcirc g_r$ and R. Thereafter, $U^{17} \bigcirc c_r$ is calculated from $U^{17} \bigcirc c_r = \text{MaskMul\_1}$ ($U \bigcirc R$, $U^{16} \bigcirc R$, R, $c_r$) by using the MaskMul\_1 circuit according to the basic principle-1. $U^{16} \bigcirc R^{16}$ and $R^{16}$ generated during this calculation process are output as $U^{16} \bigcirc R'$ and $R'$, respectively.

Figure 33:
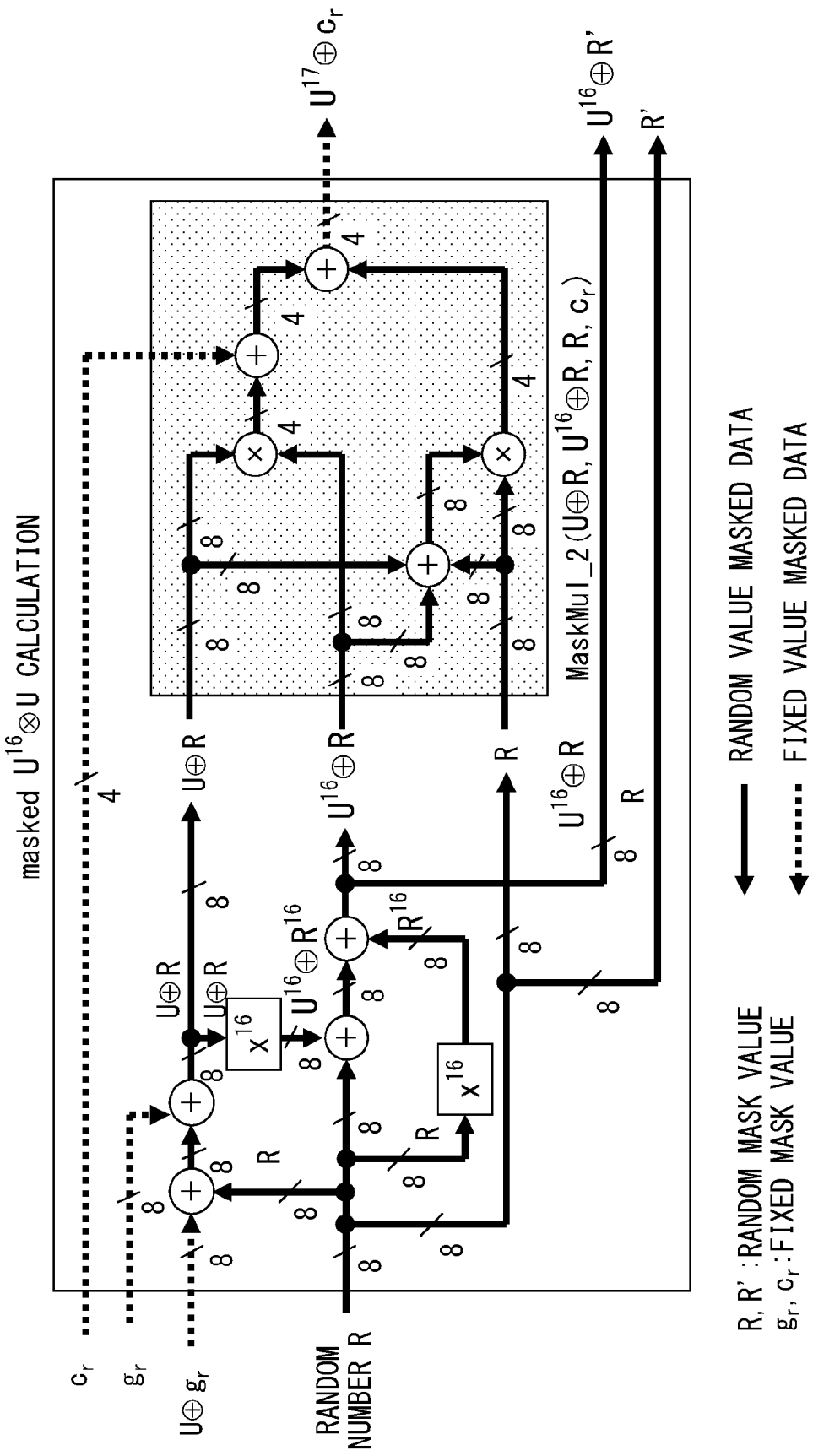
FIG. 33 illustrates a second embodiment using the basic principle-2 for a masked $U^{16} \times U$ calculation.

FIG. 33 illustrates a configuration of the second embodiment for calculating masked $U^{16} \otimes U$ by using the multiplication circuit according to the basic principle-2. Two pieces of data such as $U \bigcirc R = (U \bigcirc g_r) \bigcirc R \bigcirc g_r$ and $U^{16} \bigcirc R = (U \bigcirc R)^{16} \bigcirc R \bigcirc R^{16}$ are calculated from input data $g_r$, $U \bigcirc g_r$ and R. Thereafter, $U^{17} \bigcirc c_r$ is calculated from $U' \bigcirc c_r = \text{MaskMul\_2}$ ($U \bigcirc R$, $U^{16} \bigcirc R$, R, $c_r$) by using the MaskMul\_2 circuit according to the basic principle-2. $U^{16} \bigcirc R$ and R generated during this calculation are output as $U^{16} \bigcirc R'$ and R', respectively.

Figure 34:
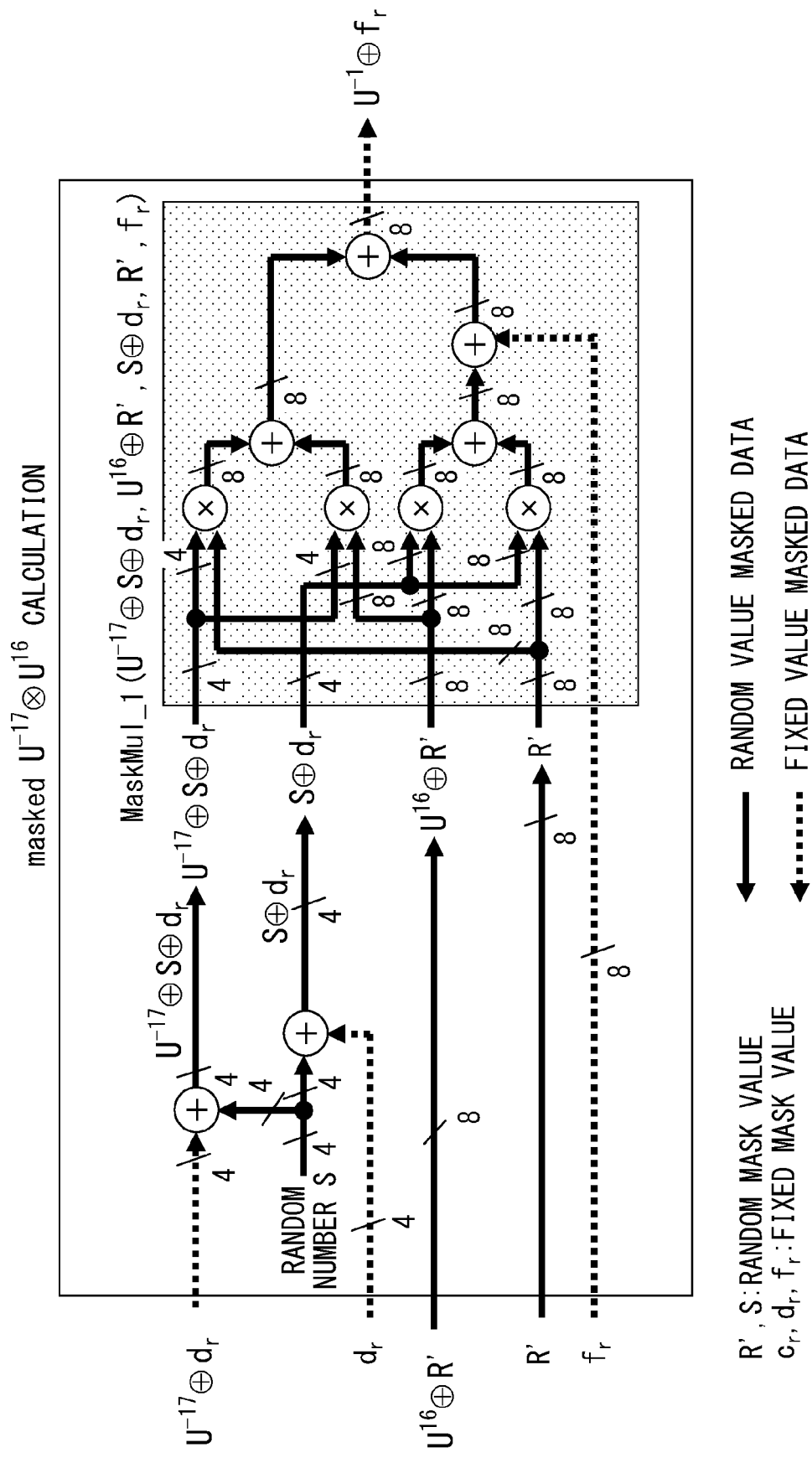
FIG. 34 illustrates a third embodiment using the basic principle-1 for a masked $U^{-17} \times U^{16}$ calculation.

FIG. 34 illustrates a configuration of a third embodiment according to the present invention for calculating masked $U^{-17} \otimes U^{16}$ by using the multiplication circuit according to the basic principle-1. Two pieces of data such as $U^{-17} \bigcirc S \bigcirc d_r = (U^{-17} \bigcirc d_r) \bigcirc S$ and $S \bigcirc d_r$ are calculated from input data $U^{-17} \bigcirc d_r$, $d_r$, $U^{16} \bigcirc R'$, R', $f_r$, and a random number S generated within the circuit. Thereafter, $U^{-1} \bigcirc f_r$ is calculated from $U^{-1} \bigcirc f_r = \text{MaskMul\_1}$ ($U^{-17} \bigcirc S \bigcirc d_r$, $U^{16} \bigcirc R$, $S \bigcirc d_r$, R', $f_r$) by using the MaskMul\_1 circuit according to the basic principle-1.

Figure 35:
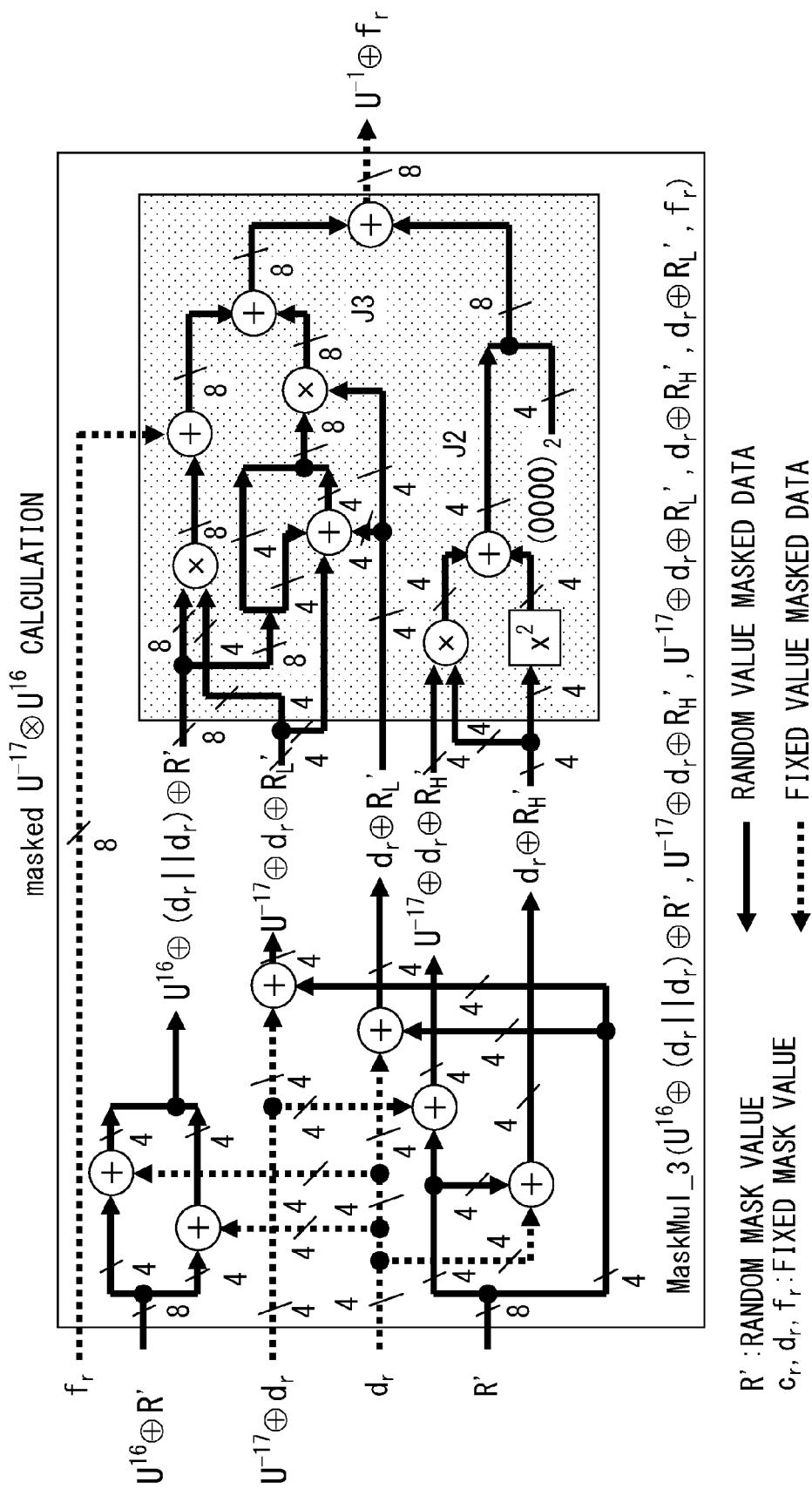
FIG. 35 illustrates a fourth embodiment using the basic principle-3 for a masked $U^{-17} \times U^{16}$ calculation.

FIG. 35 illustrates a configuration of a fourth embodiment according to the present invention for calculating masked $U^{-17} \otimes U^{16}$ by using the multiplication circuit according to the basic principle-3. Five pieces of data such as $U^{16} \bigcirc (d_r \| d_r) \bigcirc R'$, $U^{-17} \bigcirc d_r \bigcirc R'_L$, $d_r \bigcirc R'_L$, $U^{-17} \bigcirc d_r \bigcirc R'_H$ and $d_r \bigcirc R'_H$ are calculated by using input data $U^{-17} \bigcirc d_r$, $d_r$, $U^{16} \bigcirc R'$, R', and higher-order 4 bits $R'_H$ and lower-order 4 bits $R'_L$ of an 8-bit random number R'. Thereafter, $U^{-1} \bigcirc f_r$ is calculated from $U^{-1} \bigcirc f_r = \text{MaskMul\_3}(U^{16} \bigcirc (d_r \| d_r) \bigcirc R'$, $U^{-17} \bigcirc d_r \bigcirc R'_H$, $U^{-17} \bigcirc d_r \bigcirc R'_L$, $d_r \bigcirc R'_H$, $d_r \bigcirc R'_L$, $f_r$) by using the MaskMul\_3 circuit according to the basic principle-3.

Figure 36:
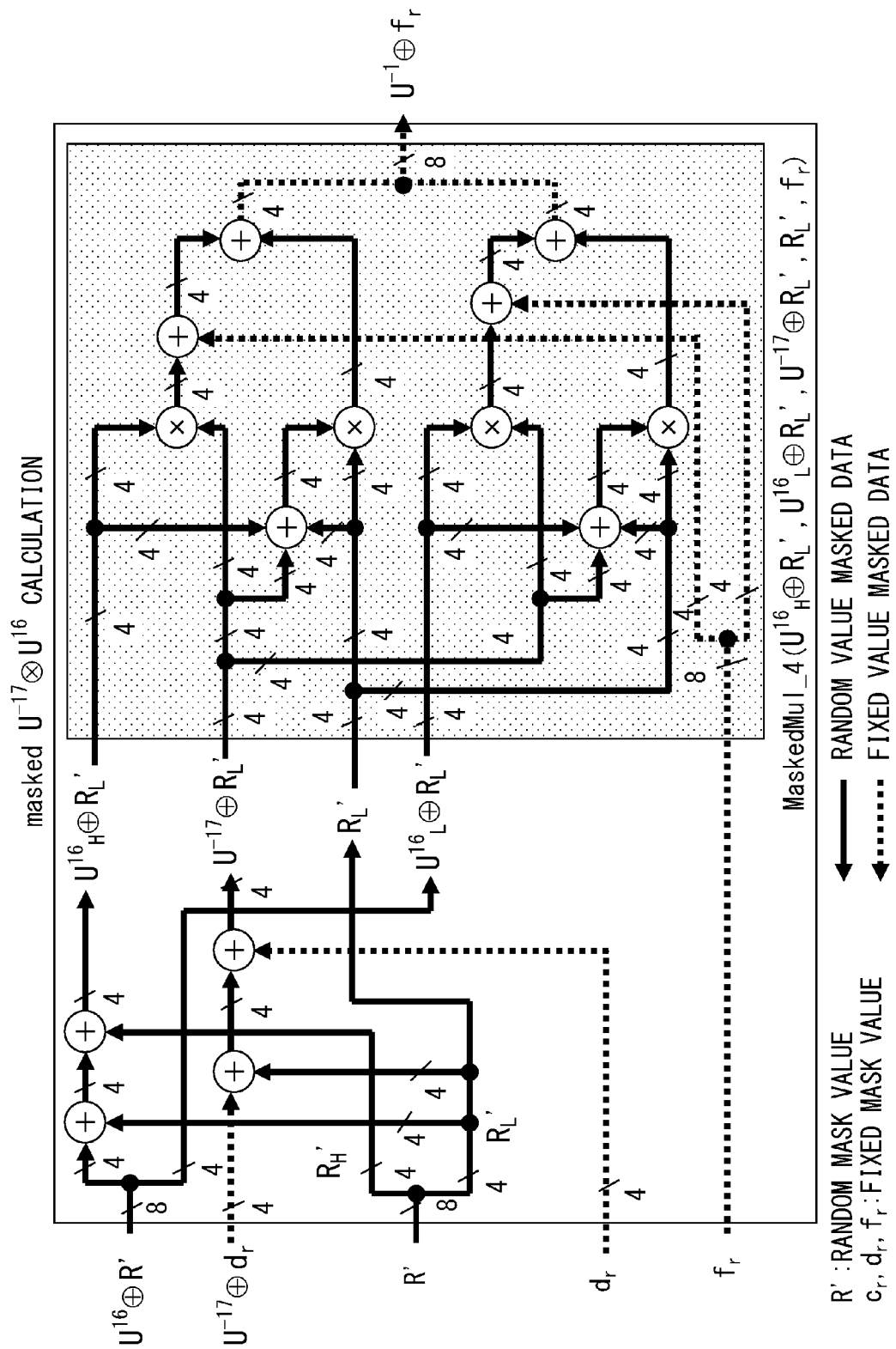
FIG. 36 illustrates a fifth embodiment using the basic principle-4 for a masked $U^{-17} \times U^{16}$ calculation.

FIG. 36 illustrates a configuration of a fifth embodiment according to the present invention for calculating masked $U^{-17} \otimes U^{16}$ by using the multiplication circuit according to the basic principle-4. Three pieces of data such as $U^{16}_H \bigcirc R'_L =$ (higher-order 4 bits of $U^{16} \bigcirc R') \bigcirc R'_L \bigcirc R'_H$, $U^{-17} \bigcirc R'_L \bigcirc d_r$, and $U^{16}_L \bigcirc R'_L =$ (lower-order 4 bits of $U^{16} \bigcirc R'$) are calculated from input data $U^{-17} \bigcirc d_r$, $d_r$, $U^{16} \bigcirc R'$, $f_r$, R', and higher-order 4 bits $R'_H$ and lower-order 4 bits $R'_L$ of an 8-bit random number R'. Note that $U^{16}_H$ and $U^{16}_L$ respectively represent the higher-order 4 bits and the lower-order 4 bits of the 8-bit value $U^{16}$. Thereafter, $U^{-1} \bigcirc f_r$ is calculated from $U^{-1} \bigcirc f_r = \text{MaskMul\_4}(U^{16}_H \bigcirc R'_L$, $U^{16}_L \bigcirc R'_L$, $U^{-17} \bigcirc R'_L$, $R'_L$, $f_r$) by using the MaskMul\_4 circuit according to the basic principle-4.

Effects of the Embodiments According to the Present Invention

An AES encryption processing apparatus according to the present invention satisfies (condition-1), (condition-2), (condition-3) and (condition-4) described in the basic principles of the present invention. Therefore, all the problems 1, 2 and 3 that cannot be solved by the conventional examples, 1, 2 and 3 can be overcome. Namely, the AES encryption processing apparatus that can satisfy all the three points such as a small circuit scale (solution to the problem 1), faster processing speed (solution to the problem 2), and the process safe from SPA and DPA (solution to the problem 3) can be implemented although such an apparatus cannot be implemented in the conventional examples. Table 3 represents comparisons between the conventional examples 1, 2 and 3 and the present invention.

Additionally, with the techniques according to the present invention, an encryption processing apparatus that solves the problems 1, 2 and 3 can be implemented not only for AES but for overall common key encryption performing a multiplication process using a composite field. The present invention is also applicable, for example, to CLEFIA (http://www sony-.co.jp/Products/clefia/technical/data/clefia-spec-1.0.pdf) that is a 128-bit common key block encryption algorithm.

Basic multiplication circuits for implementing the techniques of the present invention are four types of circuits according to the basic principle-1, the basic principle-2, the basic principle-3 and the basic principle-4. Table 4 represents the number of 8-bit×4-bit multiplications respectively needed for the circuits.

In a multiplication circuit according to the present invention, the number of 8-bit×4-bit multiplications needed varies depending on which of the first to the fifth embodiments is applied to the two calculations such as the masked $U^{16} \otimes U$ calculation and the masked $U^{-17} \otimes U^{16}$ calculation. The number of multiplications is evaluated based on a total of the number of multiplications respectively needed according to the basic principle-1 to the basic principle-4 that are a base of the embodiments. Table 5 represents evaluation results.

In the evaluations of Table 5, the number of 16th power operations is not included. This is because the 16th power operation of $GF(((2^2)^2)^2)$ is a special operation that can be implemented with a very small circuit scale. Specifically, results $X^{16}$ of the 16th power operation of X can be calculated only with a 4-bit XOR operation like $X^{16}=X_H \| (X_L \bigcirc X_H)$ by using the higher-order 4 bits $X_H$ and the lower-order 4 bits $X_L$ of X, and this is a ignorable size due to its smallness compared with the circuit scale of a multiplication circuit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention has (have) been described in detail, it should be understood that the various changes, substitutions, and alterations could be made hereto without departing from the spirit and scope of the invention.

What is claimed is:

1. A common key block encryption apparatus for computing 8-bit output data $U^{-1} \circ f_r$ from 8-bit input data $U \circ g_r$, where U is arbitrary 8-bit data, in a composite field $GF((\ldots(2^{\beta_1})\ldots)^{\beta_\gamma})$ that satisfies $\beta_\gamma=2$ by using 4-bit $c_r$, 8-bit $g_r$, 4-bit $d_r$, and 8-bit $f_r$ as fixed mask values selected with a random number r, and by using 8-bit R and R' as random mask values, comprising:

a masked $U^{16} \otimes U$ calculation circuit configured to calculate a 4-bit value $U^{17} \circ c_r$ from the input data $U \circ g_r$ with a $U^{16} \otimes U$ calculation for XORing with a random mask value, and to calculate 8-bit $U^{16} \circ R'$ and R';

a 4-bit-to-4-bit transformation table circuit that is selected with a random number r, and configured to calculate 4-bit $U^{-17} \circ d_r$ from the $U^{17} \circ c_r$ output from the masked $U^{16} \otimes U$ calculation circuit; and a masked $U^{-17} \otimes U^{16}$ calculation circuit, to which $U^{-17} \circ d_r$ output from the 4-bit-to-4-bit transformation table circuit, $U^{16} \circ R'$ output from the masked $U^{16} \otimes U$ calculation circuit, and R' are input, and which is configured to calculate the output data $U^{-1} \circ f_r$.

2. The encryption apparatus according to claim 1, wherein: the masked $U^{16} \otimes U$ calculation circuit comprises a computing circuit group, to which the fixed mask value $g_r$, the input data $U \circ g_r$, and the random mask value R are input, and which is configured to calculate three pieces of data such as $U \circ R = (U \circ g_r) \circ R \circ g_r$, $U^{16} \circ R^{16} = (U \circ R)^{16}$, and $R^{16}$, and a computing circuit group configured to perform a computation $J1=(U \circ R) \otimes (U^{16} \circ R^{16})$ $J2=R^{16} \otimes (U \circ R)$ $J3=R \otimes (U^{16} \circ R^{16})$ $J4=R \otimes R^{16}$ $J0=J1 \circ J2 \circ J3 \circ J4 \circ c_r$, or, a computing circuit group configured to perform a computation equivalent to this computation; and the J0 is input as the $U^{17} \circ c_r$ to the 4-bit-to-4-bit transformation table circuit, and the $U^{16} \circ R^{16}$ and the $R^{16}$ are input as the $U^{16} \circ R'$ and the R' to the masked $U^{-17} \otimes U^{16}$ caulcation circuit.

3. The encryption apparatus according to claim 1, wherein: the masked $U^{16} \otimes U$ calculation circuit comprises a computing circuit group, to which the fixed mask value $g_r$, the input data $U \circ g_r$, and the random mask value R are input, and which is configured to calculate two pieces of data such as $U \circ R = (U \circ g_r) \circ R \circ g_r$ and $^{16} \circ R (U \circ R)^{16} \circ R \circ R^{16}$, and a computing circuit group configured to perform a computation $J1=(U \circ R) \otimes (U^{16} \circ R)$ $J2=R \otimes ((U \circ R) \circ (U^{16} \circ R) \circ R)$ $J0=J1 \circ J2 \circ c_r$, or, a computing circuit group configured to perform a computation equivalent to this computation; and the J0 is input as the $U^{17} \circ c_r$ to the 4-bit-to-4-bit transformation table circuit, and the $U^{16} \circ R$ and the R are input as the $U^{16} \circ R'$ and the R' to the masked $U^{-17} \otimes U^{16}$ calculation circuit.

4. The encryption apparatus according to claim 1, wherein: the masked $U^{-17} \otimes U^{16}$ calculation circuit comprises a computing circuit group, to which $U^{-17} \circ d_r$ output from the 4-bit-to-4-bit transformation table circuit, the fixed mask values $d_r$ and $f_r$, $U^{16} \circ R'$ output from the masked $U^{16} \otimes U$ calculation circuit, R', and a random number S generated within the circuit are input, and which is configured to calculate two pieces of data such as $U^{-17} \otimes S \otimes d_r (U^{-17} \circ d_r) \circ S$ and $S \otimes d_r$, and a computing circuit group configured to perform a computation $J1=(U^{-17} \circ S \circ d_r) \otimes (U^{16} \circ R')$ $J2=R' \otimes (U^{-17} \circ S \circ d_r)$ $J3=(S \circ d_r) \otimes (U^{16} \circ R')$ $J4=(S \circ d_r) \otimes R'$ $J0=J1 \circ J2 \circ J3 \circ J4 \circ f_r$, or, a computing circuit group configured to perform a computation equivalent to this computation; and the J0 is output as the $U^{-1} \circ f_r$.

5. The encryption apparatus according to claim 1, wherein: the masked $U^{-17} \otimes U^{16}$ calculation circuit comprises a computing circuit group, to which $U^{-17} \circ d_r$ is output from the 4-bit-to-4-bit transformation table circuit, the fixed mask values $d_r$ and $f_r$, $U^{16} \circ R'$ is output from the masked $U^{16} \otimes U$ calculation circuit, R', and higher-order 4 bits $R'_H$ and lower-order 4 bits $R'_L$ of R' are input, and which is configured to calculate five pieces of data such as $U^{16} \circ (d_r \| d_r) \circ R'$, $U^{-17} \circ d_r \circ R'_L$, $d_r \circ R'$, $U^{-17} \circ d_r \circ R'_H$ and $d_r \circ R'_H$, and a computing circuit group configured to perform a computation $$J1=(U^{16} \circ (d_r \| d_r) \circ R') \oplus (U^{-17} \circ d_r \circ R'_H)$$

$$J2=(U^{-17} \circ d_r \circ R'_H) \oplus (d_r \circ R'_H) \circ (d_r \circ R'_H)^2$$

$$J3=((U^{16} \circ (d_r \| d_r) \circ R') \circ (U^{-17} \circ d_r \circ R'_L) \circ (d_r \circ R'_L)) \oplus (d_r \circ R'_L)$$

$$J0=J1 \circ (J2 \| (0000)_2) \circ J3 \circ f_r$$

or, a computing circuit group configured to perform a computation equivalent to this computation; and the J0 is output as the $U^{-1} \circ f_r$.

6. The encryption apparatus according to claim 1, wherein:

the masked $U^{-17} \oplus U^{16}$ calculation circuit comprises a computing circuit group, to which $U^{-17} \circ d_r$ output from the 4-bit-to-4-bit transformation table circuit, the fixed mask values $d_r$ and $f_r$, $U^{16} \circ R'$ output from the masked $U^{16} \oplus U$ calculation circuit, R', and higher-order 4 bits $R'_H$ and lower-order 4-bits $R'_L$ of R' are input, and which is configured to calculate three pieces of data such as $U^{16}{}_H \circ R'_L$=(higher-order 4 bits of $U^{16} \circ R'$)$\circ R'_L \circ R'_H$, $U^{-17} \circ R'_L = (U^{-17} \circ d_r) \circ R'_L \circ d_r$, $U^{16}{}_L \circ R'_L$=(lower-order 4 bits of $U^{16} \circ R'$) by using $U^{16}{}_H$ and $U^{16}{}_L$ respectively as higher-order 4 bits and lower-order 4 bits of an 8-bit value $U^{16}$, and a computing circuit group configured to perform a computation $$J1=(U^{16}{}_H \circ R'_L) \oplus (U^{-17} \circ R'_L)$$

$$J2=((U^{16}{}_H \circ R'_L) \circ (U^{-17} \circ R'_L) \circ R'_L) \oplus R'_L$$

$$J3=(U^{16}{}_L \circ R'_L) \oplus (U^{-17} \circ R')$$

$$J4=((U^{16}{}_L \circ R'_L) \circ (U^{-17} \circ R'_L) \circ R'_L) \oplus R'_L$$

$$J0=((J1 \circ J2) \| (J3 \circ J4)) \circ f_r$$

or, a computing circuit group configured to perform a computation equivalent to this computation; and the J0 is input as the $U^{-1} \circ f_r$.

7. The encryption apparatus according to claim 1, wherein U is a linear transformation δ of 8-bit input data.

8. The encryption apparatus according to claim 7, wherein linear transformation δ is a matrix operation performing an isomorphism function.

\* \* \* \* \*

UNITED STATES PATENT AND TRADEMARK OFFICE
CERTIFICATE OF CORRECTION

PATENT NO. : 8,369,516 B2  Page 1 of 1
APPLICATION NO. : 12/889096
DATED : February 5, 2013
INVENTOR(S) : Kouichi Itoh et al.

It is certified that error appears in the above-identified patent and that said Letters Patent is hereby corrected as shown below:

In the Claims:

Column 28, Line 11, In Claim 2, delete "caulcation" and insert -- calculation --, therefor.

Column 28, Line 17, In Claim 3, delete " $^{16}oR$ " and insert -- $^{16}oR=$ --, therefor.

Column 28, Line 35, In Claim 4, delete " $U^{-17}\odot d_r$ " and insert -- $U^{-17}od_r$ --, therefor.

Column 28, Line 41, In Claim 4, delete " $U^{-17}\odot S\odot d_r$ " and insert -- $U^{-17}oSod_r$ --, therefor.

Column 28, Line 41, In Claim 4, delete " $S\odot d_r$ " and insert -- $Sod_r$ --, therefor.

Column 28, Line 58, In Claim 5, delete " $U^{-17}\odot d_r$ " and insert -- $U^{-17}od_r$ --, therefor.

Column 29, Line 22, In Claim 6, delete " $U^{16}\odot R')$ " and insert -- $U^{16}oR')$ --, therefor.

Column 30, Line 9, In Claim 6, delete " $(U^{-17}oR'$ " and insert -- $(U^{-17}oR'L)$ --, therefor.

Signed and Sealed this
Thirtieth Day of April, 2013

Teresa Stanek Rea
*Acting Director of the United States Patent and Trademark Office*